(12) United States Patent
Aoki et al.

(10) Patent No.: US 12,271,539 B2
(45) Date of Patent: Apr. 8, 2025

(54) ELECTRONIC PEN, ELECTRONIC PEN CARTRIDGE, AND ELECTRONIC PEN CHARGING TRAY

(71) Applicant: Wacom Co., Ltd., Saitama (JP)

(72) Inventors: Shinya Aoki, Saitama (JP); Takenori Kaneda, Saitama (JP); Yoshiyuki Hashimoto, Saitama (JP); Toru Eguchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/460,398

(22) Filed: Sep. 1, 2023

(65) Prior Publication Data

US 2023/0409129 A1 Dec. 21, 2023

Related U.S. Application Data

(63) Continuation of application No. 17/741,664, filed on May 11, 2022, now Pat. No. 11,782,526, which is a
(Continued)

(30) Foreign Application Priority Data

Jan. 21, 2020 (JP) ................................. 2020-007229

(51) Int. Cl.
*G06F 3/0354* (2013.01)
*G06F 1/26* (2006.01)
(Continued)

(52) U.S. Cl.
CPC ............ *G06F 3/03545* (2013.01); *G06F 1/26* (2013.01); *G06F 3/0383* (2013.01); *G06F 3/046* (2013.01)

(58) Field of Classification Search
CPC ................................................. G06F 3/03545
(Continued)

(56) References Cited

U.S. PATENT DOCUMENTS 9,898,098 B2 * 2/2018 Immel .................. G06F 3/03545
2014/0306940 A1 * 10/2014 Fukushima ............. G06F 3/046
345/179
(Continued)

FOREIGN PATENT DOCUMENTS

JP 2013-161307 A 8/2013
JP 5687398 B1 3/2015
(Continued)

OTHER PUBLICATIONS

Extended European Search Report, dated Dec. 19, 2022, for European Application No. 21744701.0-1224, 10 pages.
(Continued)

*Primary Examiner* — Koosha Sharifi-Tafreshi
(74) *Attorney, Agent, or Firm* — Seed IP Law Group LLP

(57) ABSTRACT

An electronic pen cartridge is replaceable with a refill of a stationery ballpoint pen such that the stationery ballpoint pen housing can be reused as the electronic pen housing. The electronic pen cartridge is of a capacitance type and includes a pen tip which is projectable from an opening on one side in an axial direction of the pen housing. Inside the tubular cartridge housing are an electronic circuit including a signal transmission circuit configured to generate a signal to be supplied to a position detection sensor, and a rechargeable power storage device configured to supply a power supply voltage to the electronic circuit. A coil is wound around a portion of the cartridge housing, the portion located at a position where there is room in the pen housing. The power storage device is charged by a current induced in the coil based on an externally supplied magnetic field.

19 Claims, 12 Drawing Sheets

Related U.S. Application Data continuation of application No. PCT/JP2021/000665, filed on Jan. 12, 2021.

(51) Int. Cl.
  *G06F 3/038* (2013.01)
  *G06F 3/046* (2006.01)

(58) Field of Classification Search
  USPC .......................................................... 345/179
  See application file for complete search history.

(56) References Cited

U.S. PATENT DOCUMENTS

| | | |
|---|---|---|
| 2015/0130772 A1 | 5/2015 | Katsurahira |
| 2016/0188008 A1 | 6/2016 | Horie et al. |
| 2016/0188016 A1* | 6/2016 | Munakata ............ G06F 3/04162 345/179 |
| 2016/0246389 A1* | 8/2016 | Munakata ............ G06F 3/03545 |
| 2017/0228049 A1* | 8/2017 | Yamamoto .......... G06F 3/03545 |
| 2017/0285772 A1* | 10/2017 | Yamamoto ............ G06F 3/0446 |
| 2018/0011557 A1* | 1/2018 | Katsurahira .......... G06F 3/0383 |
| 2019/0025952 A1 | 1/2019 | Aoki et al. |
| 2019/0243474 A1 | 8/2019 | Oda et al. |
| 2021/0099025 A1* | 4/2021 | Gaule ................... H02J 7/0047 |

FOREIGN PATENT DOCUMENTS

| | | |
|---|---|---|
| JP | 5959038 B1 | 8/2016 |
| JP | 2019-106841 A | 6/2019 |
| WO | 2014/097953 A1 | 6/2014 |

OTHER PUBLICATIONS

International Search Report, mailed Mar. 23, 2021, for International Application No. PCT/JP2021/000665, 4 pages.

* cited by examiner

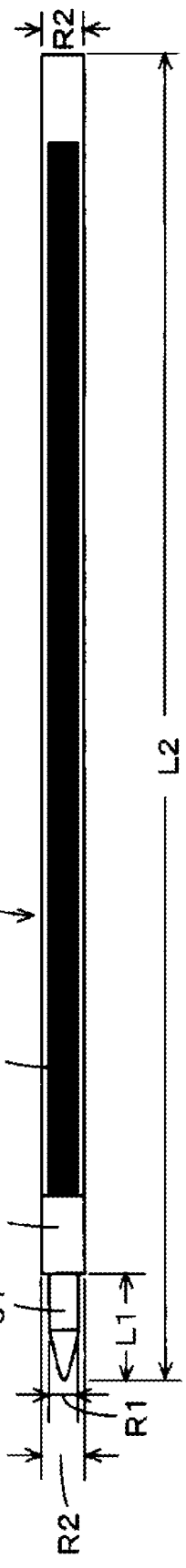
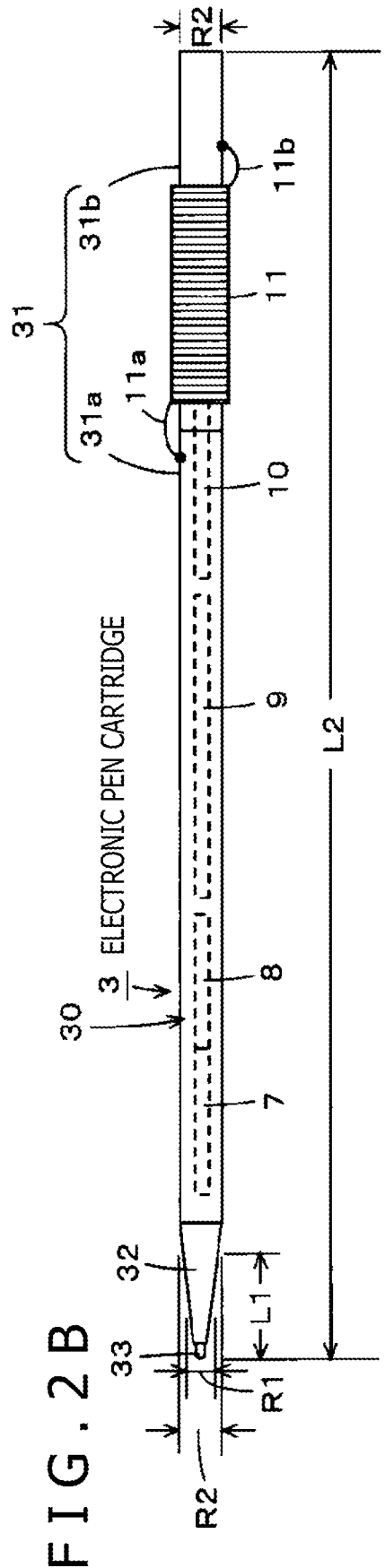
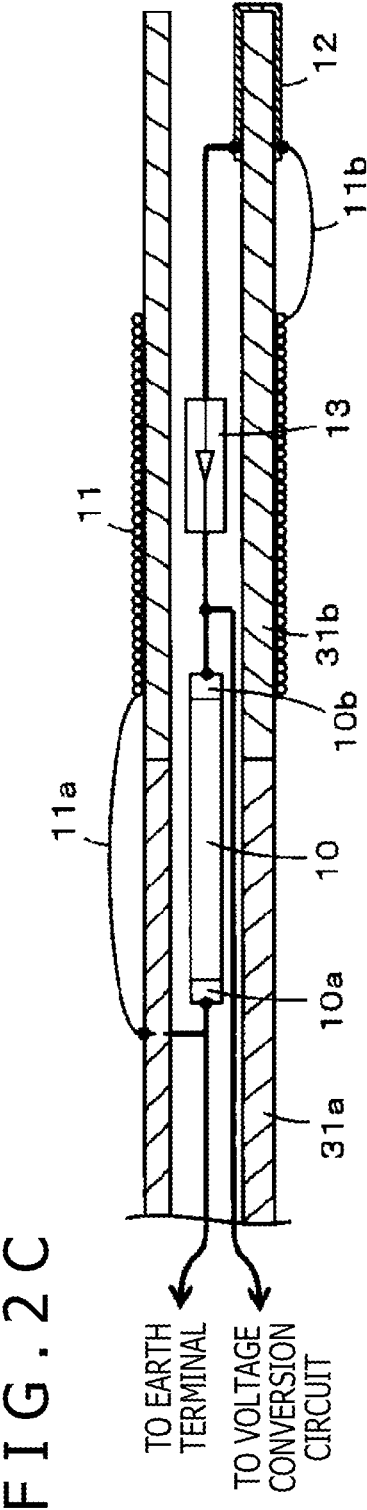
F I G. 2 A
F I G. 2 B
F I G. 2 C

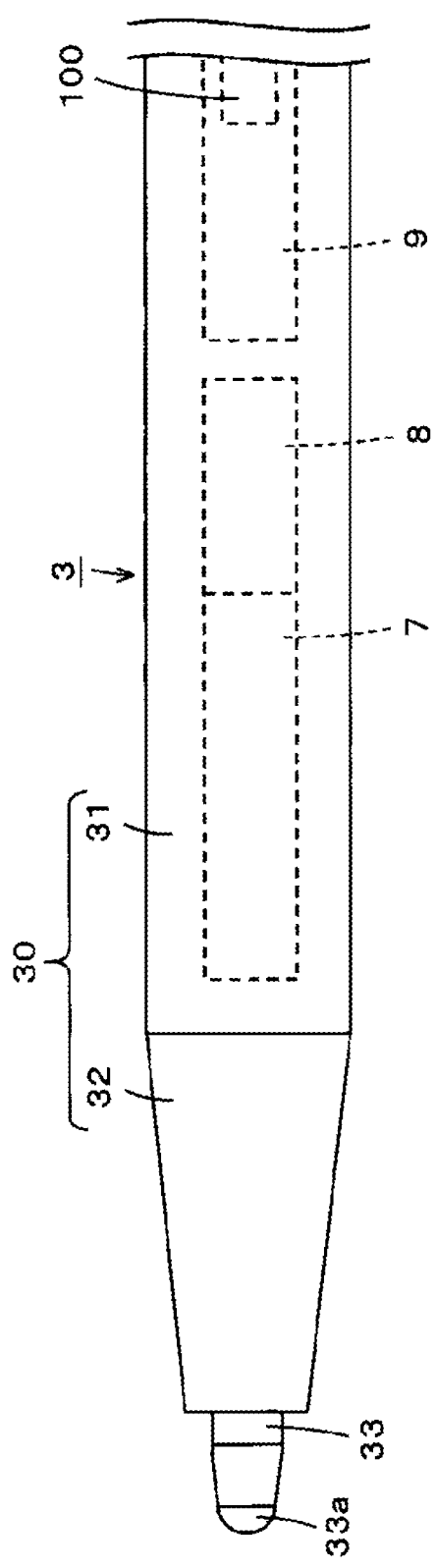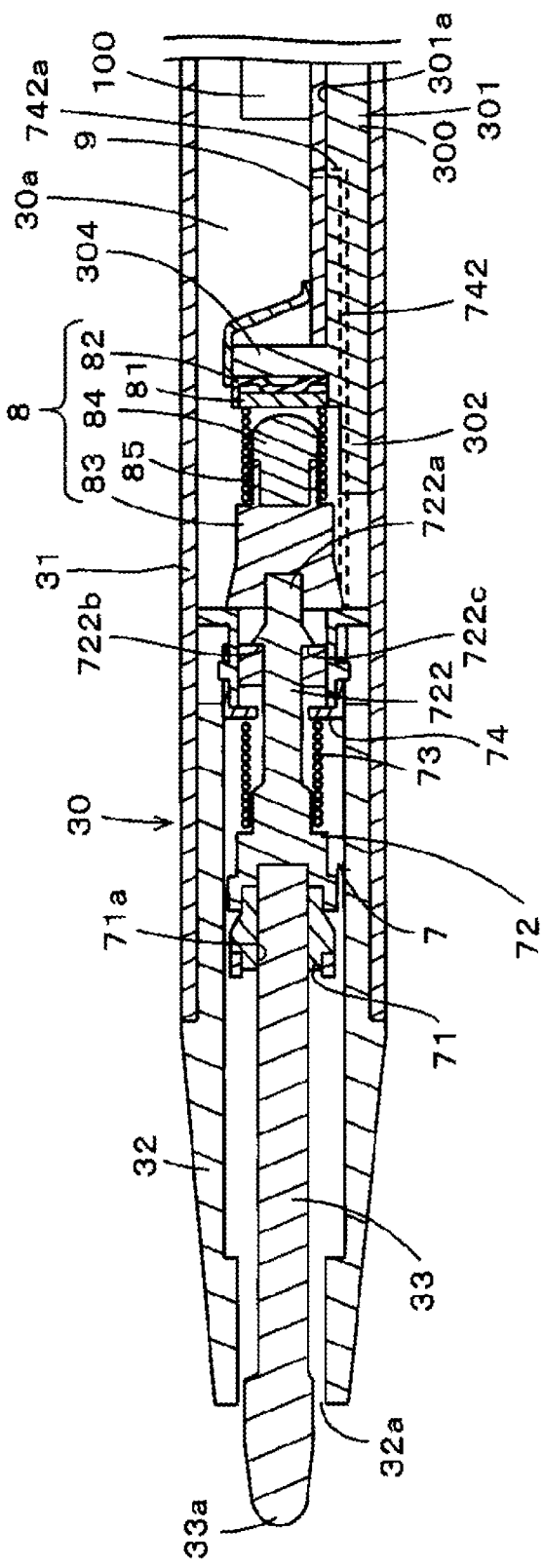

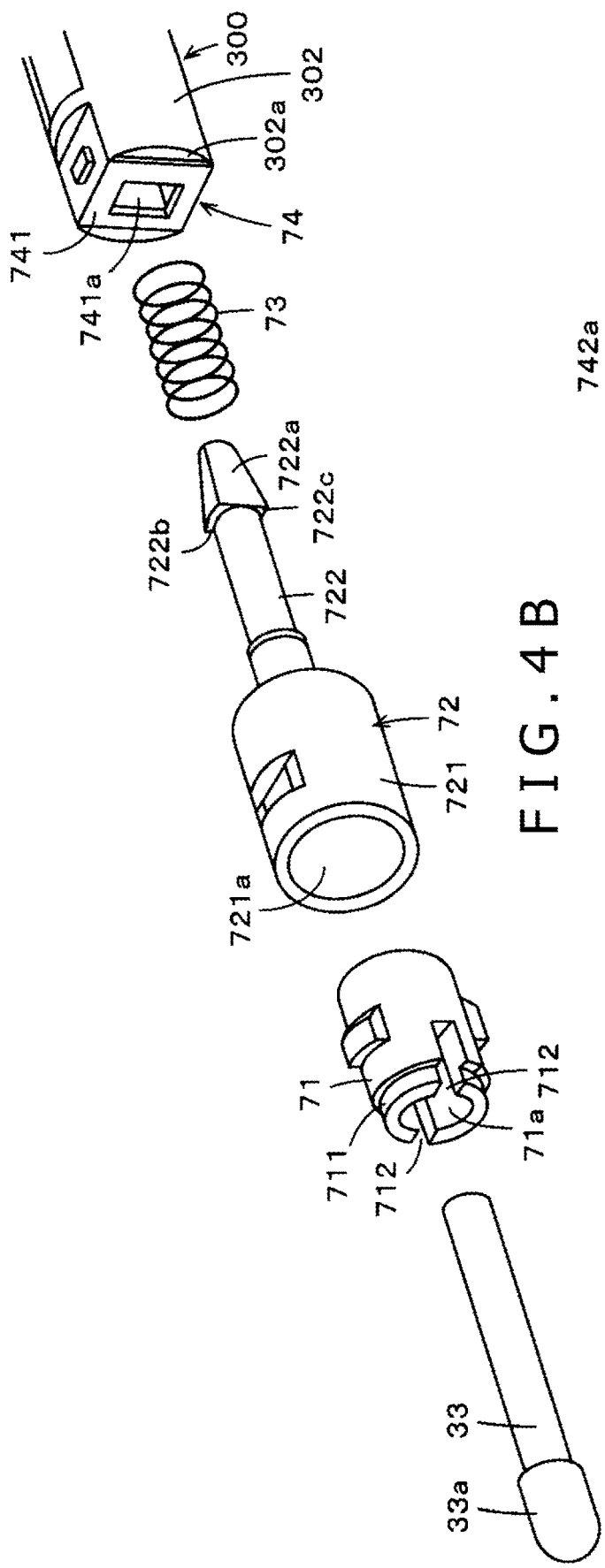
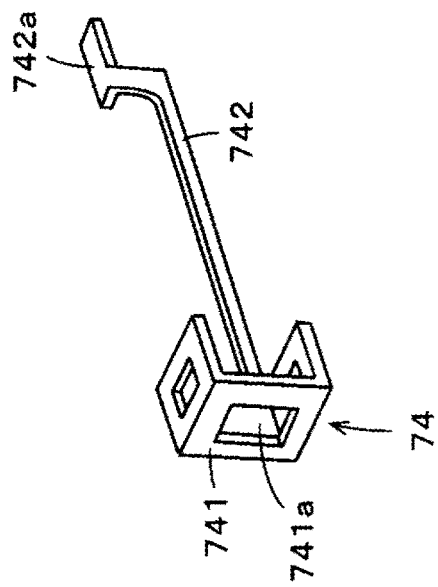
FIG. 4A
FIG. 4B

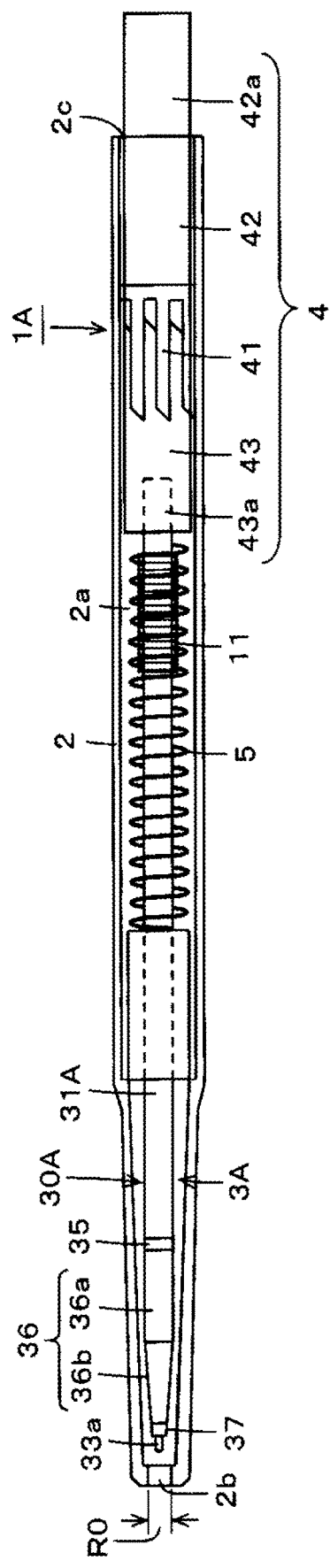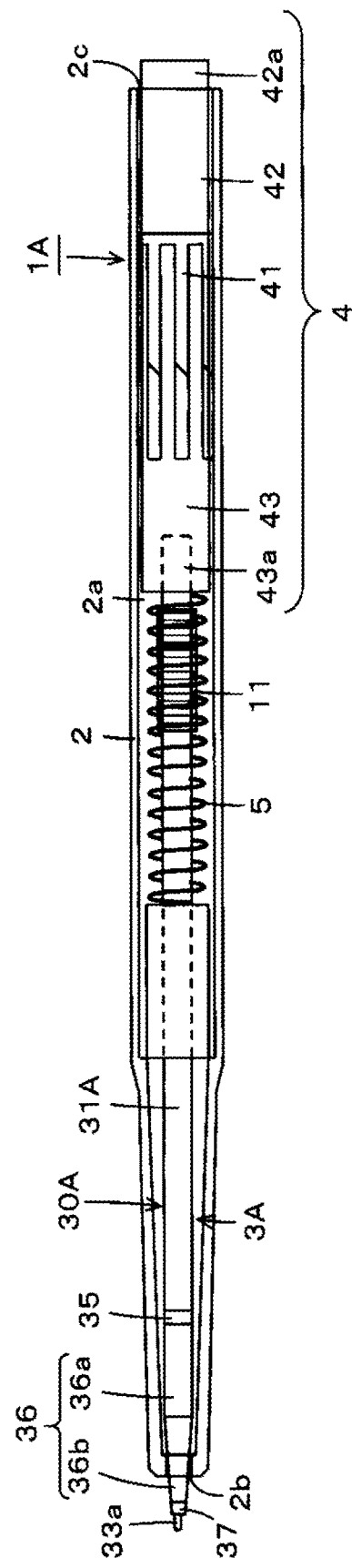

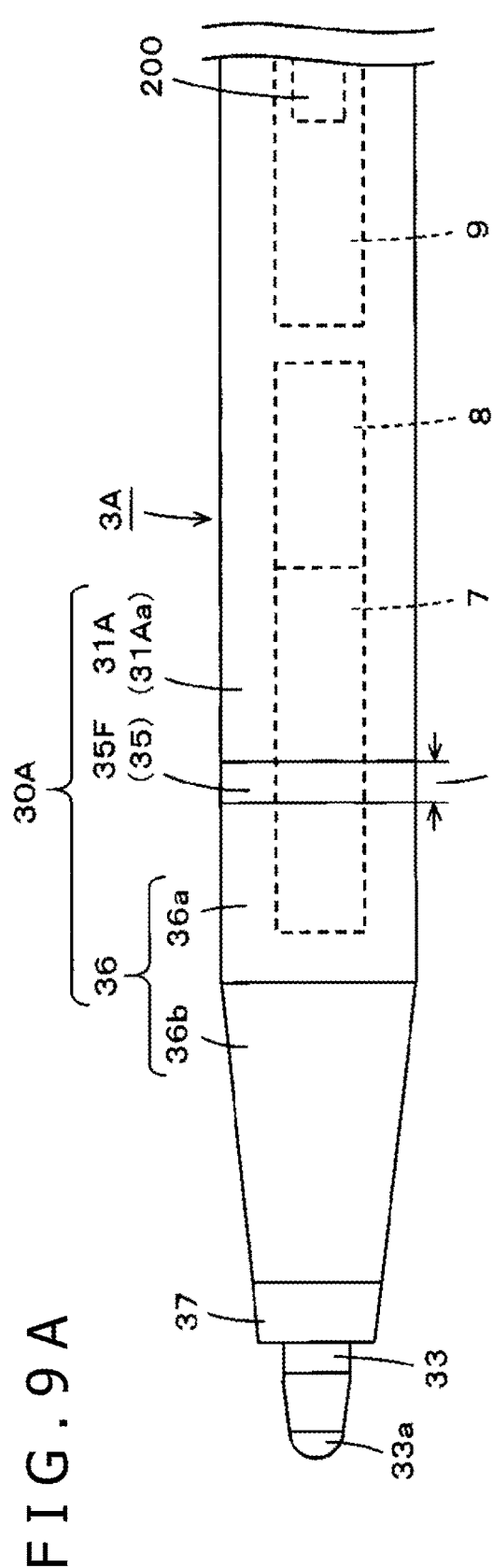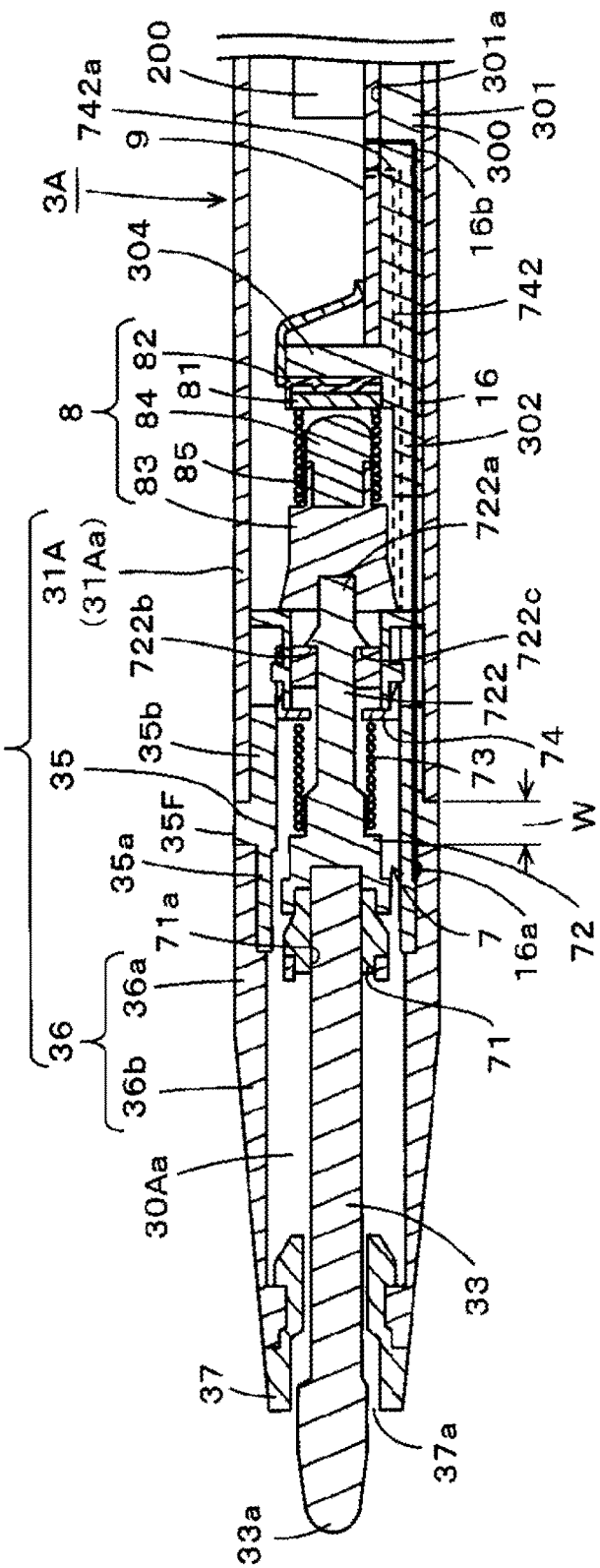
FIG. 9A
FIG. 9B

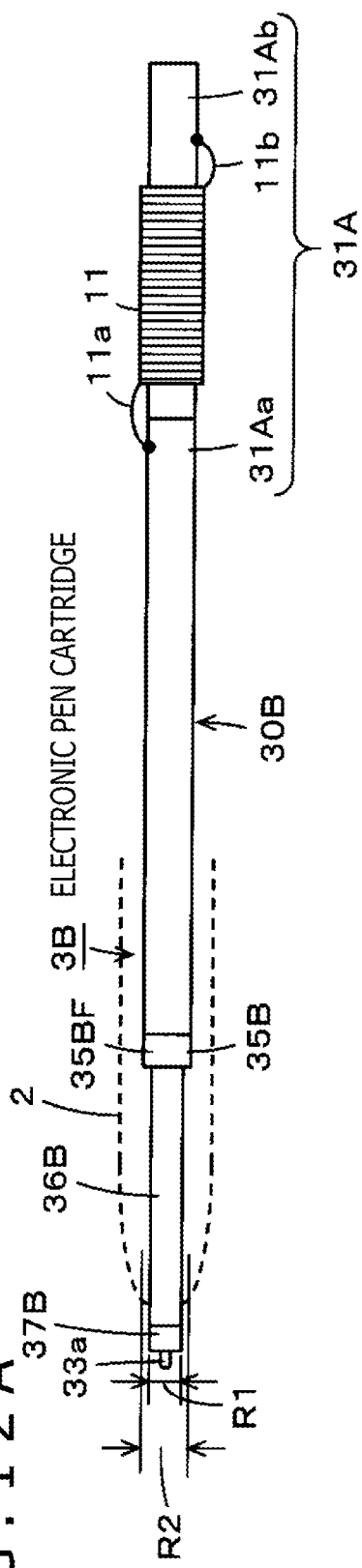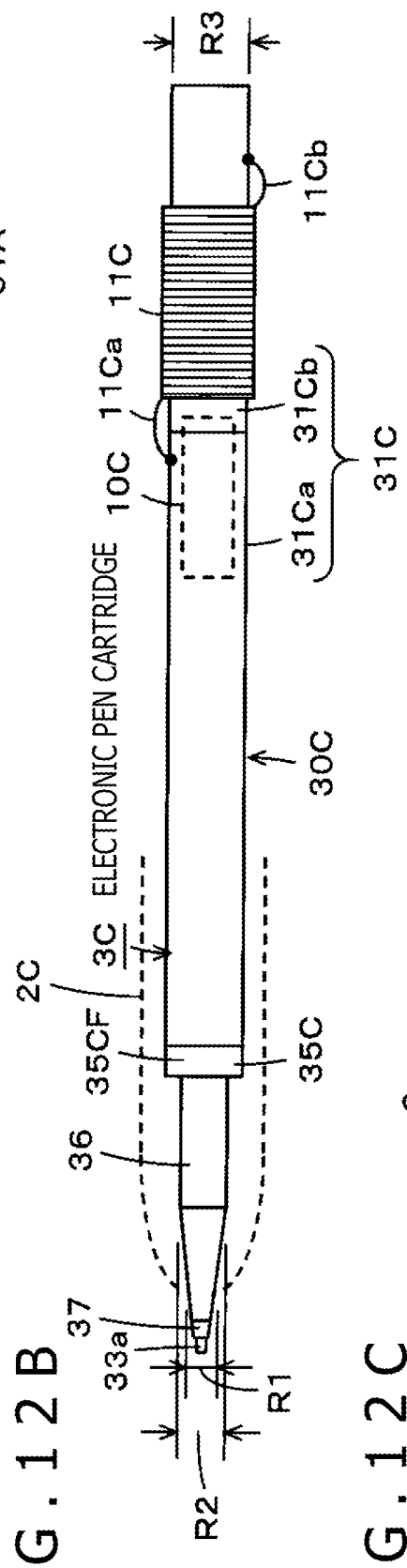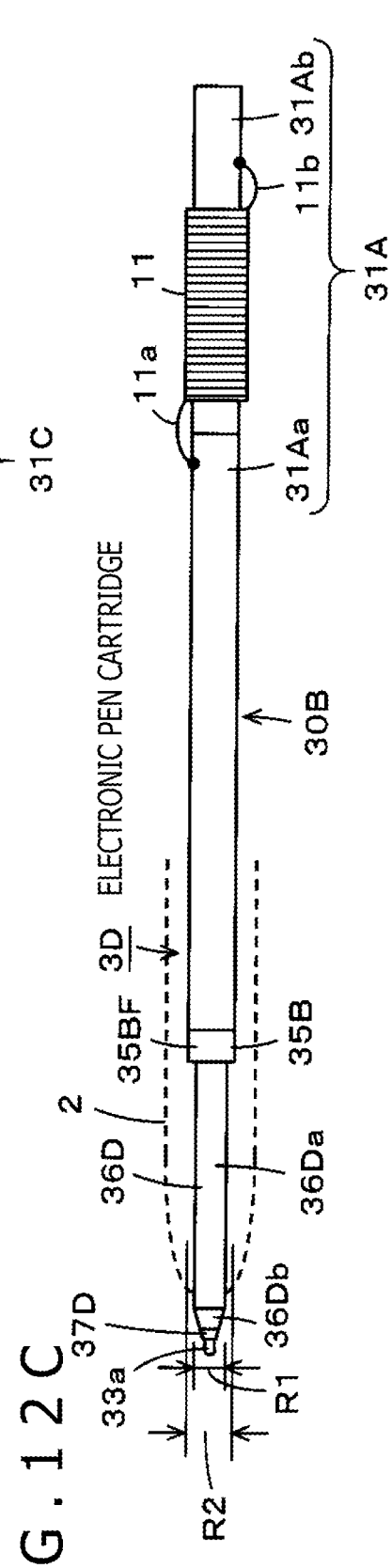

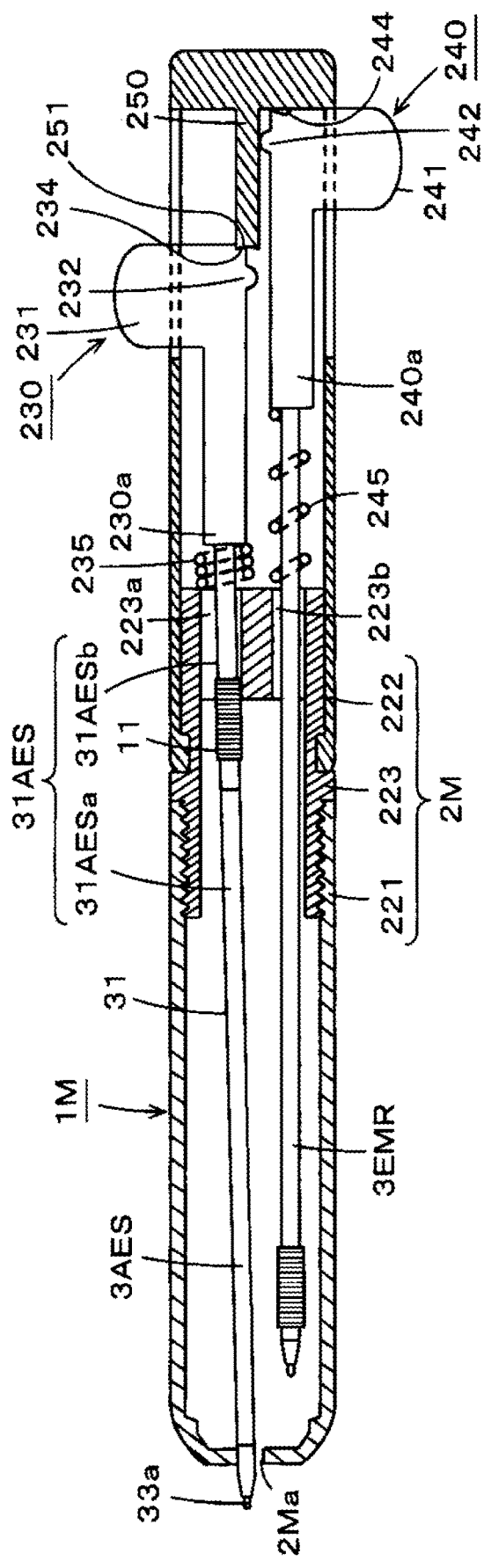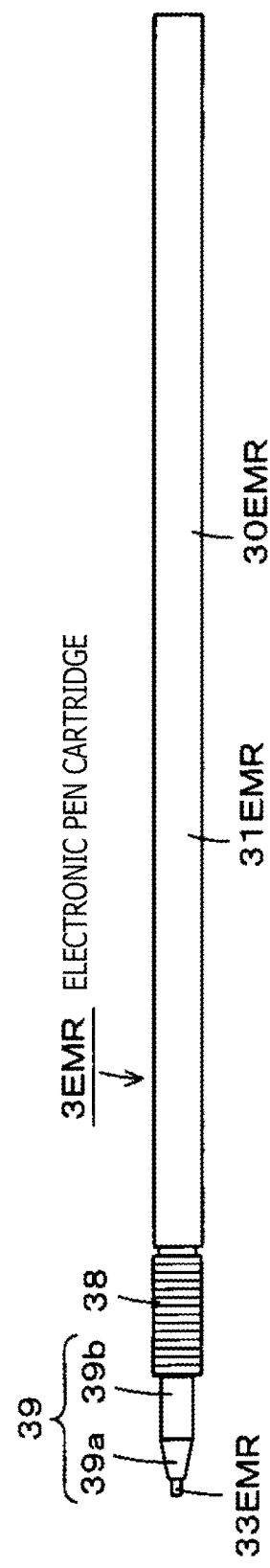
FIG. 13A
FIG. 13B

ELECTRONIC PEN, ELECTRONIC PEN CARTRIDGE, AND ELECTRONIC PEN CHARGING TRAY

TECHNICAL FIELD

The present disclosure relates to an electronic pen and electronic pen cartridge of a capacitance type that transmit and receive signals through electric-field coupling with a position detection sensor. The present disclosure also relates to an electronic pen charging tray.

BACKGROUND ART

An electronic pen of an active capacitance type includes a power supply circuit and a signal transmission circuit incorporated therein, as well as an axial center body made of a conductor. The power supply circuit uses a rechargeable power storage device such as a primary or secondary battery or an electric double layer capacitor. The electronic pen of the active capacitance type transmits a signal from the signal transmission circuit to a position detection sensor via the conductive axial center body through capacitive coupling (see, for example, Patent Document 1 (Japanese Patent No. 5687398)).

In view of the recent preference for miniaturization, an increasing demand exists for miniaturizing portable electronic devices. Further, electronic pens are increasingly used with position detection sensors mounted on such small electronic devices, and a demand exists for thinner electronic pens.

Recently, an electronic pen is regarded as an extension of stationery, and there is a demand for internal configurations of an electronic pen to be modularized so as to be handled in a way similar to that of a refill (a refill or a cartridge) of a ballpoint pen. In the present application, a product which results from modularizing and integrating components of internal configurations of an electronic pen and which is configured to be replaceable, like a refill of a ballpoint pen, will be hereinafter referred to as an electronic pen cartridge.

The applicant has previously proposed an electronic pen cartridge for an electronic pen of an electromagnetic induction type that can be handled in a way similar to that of a refill of a stationery ballpoint pen by using the housing of the ballpoint pen as it is, since such electronic pen cartridge does not require a power supply circuit that uses a primary battery or a secondary battery (see, for example, Patent Document 2 (Japanese Patent No. 5959038)).

PRIOR ART DOCUMENT

Patent Documents

Patent Document 1: Japanese Patent No. 5687398
 Patent Document 2: Japanese Patent No. 5959038
Patent Document 3
 :WO 2014/097953A1

SUMMARY

Technical Problems

However, as described above, an electronic pen of the active capacitance type requires a power supply circuit using a primary battery or a secondary battery. Therefore, it has been difficult to provide an electronic pen cartridge that can be handled in a similar manner to a refill of a stationery ballpoint pen by using the housing of the ballpoint pen as it is.

That is, some problems arise when an attempt is made to mount a primary battery in an electronic pen cartridge of an electronic pen of the active capacitance type. A primary battery that can be stored in a housing of an ultra-slim electronic pen cartridge needs to be a dedicated one and is expensive. Moreover, since it is difficult to obtain a primary battery with sufficient battery capacity, the primary battery needs to be replaced frequently. Therefore, since a primary battery needs to be mounted in a housing of an electronic pen so as to supply a power supply voltage to an electronic pen cartridge, it has been difficult to use a housing of a stationery ballpoint pen as it is.

The applicant has proposed an electronic pen of the active capacitance type (see Patent Document 3 (WO2014/097953A1)). In this electronic pen, a power storage device is disposed in the housing thereof, and a component with a coil wound around a ferrite core is disposed on the pen tip side, similarly to an electronic pen of an electromagnetic induction type. The power storage device is charged by an external magnetic field, which is used for charging purposes and which causes an electromagnetic induction current to flow through this coil. In the electronic pen of the active capacitance type according to Patent Document 3, a conductive axial center body is configured to be inserted through a through-hole of the ferrite core.

With the technique of Patent Document 3, a power storage device can be housed in a housing of an ultra-slim electronic pen cartridge, and a ferrite core around which a coil is wound can be disposed on the pen tip side, similarly to an electronic pen cartridge of the electromagnetic induction type. In this way, it is possible to provide an electronic pen cartridge of the active capacitance type configured as described above.

However, there is also a two-way communication type electronic pen available among electronic pens of the active capacitance type. In the electronic pen of this type, an axial center body is used as a center electrode, a peripheral electrode is disposed to surround the center electrode, and the peripheral electrode and the center electrode transmit and receive signals to and from a position detection sensor. In the case of an electronic pen cartridge of this type, that is, the two-way communication active capacitance type, the position of the peripheral electrode coincides with the position of the ferrite core around which the coil is wound and, therefore, it is difficult to make the thickness of the electronic pen cartridge such as to ensure compatibility with a refill of a stationery ballpoint pen.

An aspect of the present disclosure is directed to providing an electronic pen cartridge capable of solving the problems described above.

Technical Solution

In order to solve the issues described above, there is provided an electronic pen cartridge housed in a tubular pen housing of an electronic pen such that at least a pen tip is projectable from an opening on one side in an axial direction of the pen housing. The electronic pen cartridge includes a tubular cartridge housing, an electronic circuit that is disposed in the cartridge housing and that includes a signal transmission circuit configured to generate, in operation, a signal to be supplied to a position detection sensor, a rechargeable power storage device that is disposed in the cartridge housing and that, in operation, supplies a power supply voltage to the electronic circuit, and a coil wound around an outside of a rear end portion of the cartridge housing, the rear end portion being located on a side of the cartridge housing opposite from the pen tip side in an axial direction of the cartridge housing. The power storage device is configured to be charged by an induced current that is induced in the coil based on an externally supplied magnetic field.

In the electronic pen cartridge having the configuration described above, the power storage device that is relatively easily miniaturized can be housed in the cartridge housing and charged by the induced current induced in the coil, which is disposed on the rear end side of the cartridge housing, based on the externally supplied magnetic field.

According to the electronic pen cartridge having the configuration described above, the coil for inducing the induced current for charging based on the external magnetic field is disposed on the rear end side of the cartridge housing. Therefore, even if the electronic pen cartridge is of the type in which an axial center body is used as a center electrode, in which a peripheral electrode is disposed so as to surround the center electrode, and in which the peripheral electrode and the center electrode transmit and receive signals to and from the position detection sensor, the pen tip side can be configured so as to easily ensure compatibility with a refill of a ballpoint pen.

In addition, the coil for inducing the induced current for charging based on the external magnetic field is disposed on the rear end side of the cartridge housing of the electronic pen cartridge, and the coil is wound around the outside of the rear end portion of the cartridge housing in the axial direction of the cartridge housing. The position at which the coil is disposed is where there is room in the pen housing and, therefore, a configuration becomes possible that easily ensures compatibility with a refill of a ballpoint pen.

Therefore, according to the electronic pen cartridge having the configuration described above, which is the electronic pen cartridge of the electronic pen of an active capacitance type, there is an effect that the electronic pen cartridge can be compatible with a refill of a stationery ballpoint pen and that the housing of the ballpoint pen can be used as it is as the pen housing of the electronic pen of the active capacitance type.

BRIEF DESCRIPTION OF DRAWINGS

FIGS. 2A-2C illustrate views for describing the electronic pen cartridge according to the first embodiment of the present disclosure.

FIGS. 3A and 3B illustrate views for describing an example of a configuration of the pen tip side of the electronic pen cartridge according to the first embodiment of the present disclosure.

FIGS. 4A and 4B illustrate exploded perspective views for describing an example of constituent components on the pen tip side of the electronic pen cartridge according to the first embodiment of the present disclosure.

FIGS. 7A and 7B illustrate views of an overview of an electronic pen according to a second embodiment of the present disclosure in which an electronic pen cartridge according to the second embodiment is mounted.

FIGS. 9A and 9B illustrate views for describing an example of a configuration of the pen tip side of the electronic pen cartridge according to the second embodiment of the present disclosure.

FIGS. 12A-12C illustrate views for describing an electronic pen cartridge according to another embodiment of the present disclosure.

FIGS. 13A and 13B illustrate views for describing an electronic pen according to another embodiment of the present disclosure

DETAILED DESCRIPTION

Figure 1A:
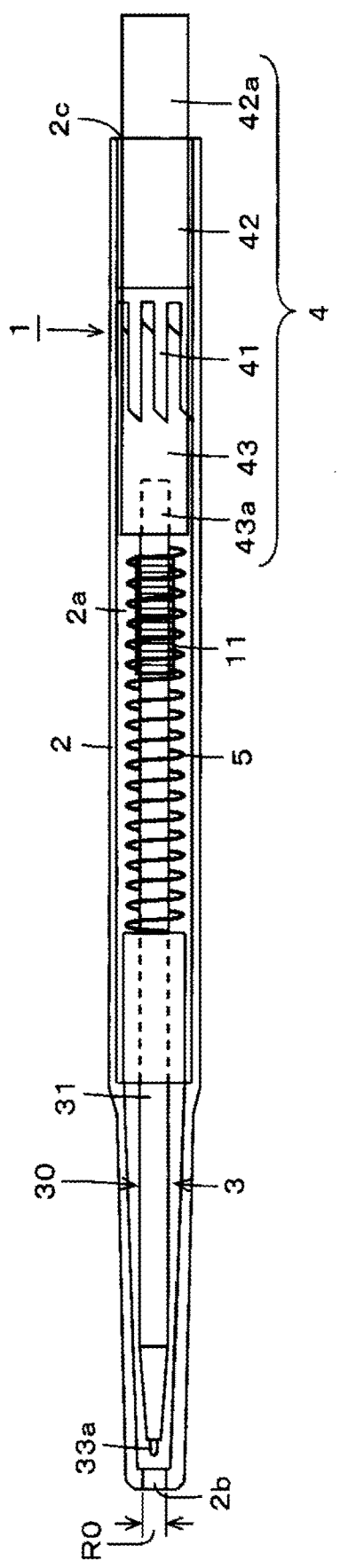
FIGS. 1A and 1B illustrate views of an overview of an electronic pen according to a first embodiment of the present disclosure in which an electronic pen cartridge according to the first embodiment is mounted.

Embodiments of an electronic pen and an electronic pen cartridge according to the present disclosure will be described below with reference to the drawings.

First Embodiment

An electronic pen according to a first embodiment has a cartridge-type configuration and has a configuration in which an electronic pen cartridge is detachably housed in a tubular housing of the electronic pen. FIG. 1 illustrates views of an example of a configuration of the electronic pen according to the first embodiment of the present disclosure. An electronic pen 1 according to the first embodiment has a knock-type configuration in which an electronic pen cartridge 3 is housed in a hollow portion 2a of a tubular housing 2 (hereinafter referred to as a pen housing 2) and in which the pen tip side of the electronic pen cartridge 3 is projected and retracted from an opening 2b at one end in the longitudinal direction of the pen housing 2 by a knock cam mechanism unit 4.

Figure 1B:
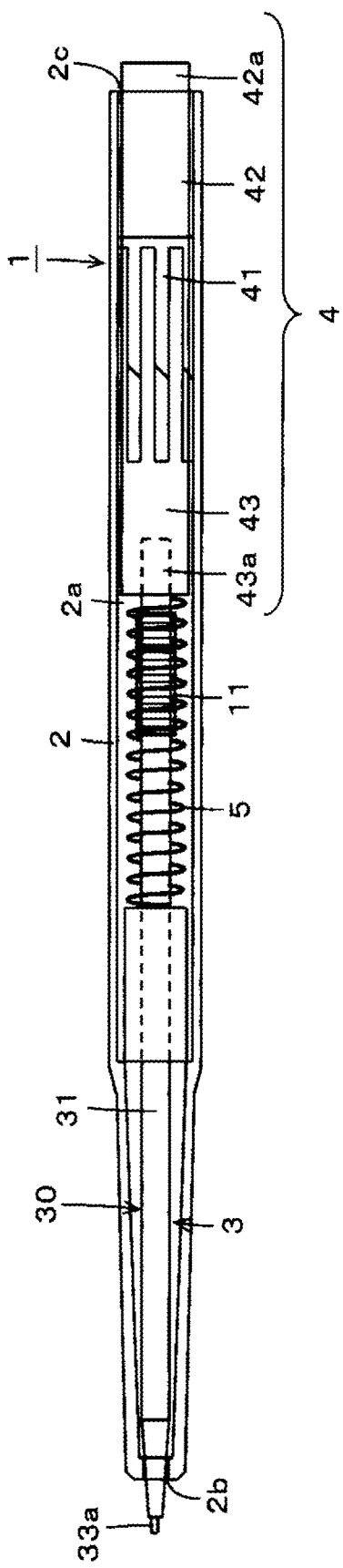

FIG. 1A illustrates the state in which the entire electronic pen cartridge 3 is housed in the hollow portion 2a of the pen housing 2, while FIG. 1B illustrates the state in which the pen tip side of the electronic pen cartridge 3 projects from the opening 2b of the pen housing 2 by the knock cam mechanism unit 4. It is noted that the examples of FIG. 1 illustrate the state in which the pen housing 2 of the electronic pen 1 is made of a transparent synthetic resin and in which the inside thereof is see-through.

The electronic pen 1 according to this embodiment is configured to be compatible with a commercially-available knock-type ballpoint pen.

The pen housing 2 and the knock cam mechanism unit 4, which is disposed in the pen housing 2, have the same configurations as those of a well-known commercially-available knock-type ballpoint pen, and have the same dimensional relation as that of the well-known commercially-available knock-type ballpoint pen.

As illustrated in FIG. 1, the knock cam mechanism unit 4 has a well-known configuration in which a cam main body 41, a knock bar 42, and a rotor 43 are combined with each other. The cam main body 41 is formed on an inner wall surface of the tubular pen housing 2. The knock bar 42 is configured such that an end portion 42a thereof projects from an opening 2c on the side opposite from the pen tip side of the pen housing 2, to receive a knock operation by a user. The rotor 43 includes a fitting portion 43a to which an end portion of the electronic pen cartridge 3 on the side opposite from the pen tip side is fitted.

In the electronic pen 1 having the configuration described above, when the end portion 42a of the knock bar 42 is pressed in the state of FIG. 1A, the electronic pen cartridge 3 is locked into the state of FIG. 1B in the pen housing 2 by the knock cam mechanism unit 4. Accordingly, the pen tip side of the electronic pen cartridge 3 projects from the opening 2b of the pen housing 2. Then, when the end portion 42a of the knock bar 42 is pressed again in the state of FIG. 1B, the locked state is released by the knock cam mechanism unit 4, and the position of the electronic pen cartridge 3 in the pen housing 2 returns to the state of FIG. 1A by a return spring 5. Since the detailed configuration and operation of the knock cam mechanism unit 4 are well known, the description thereof is omitted.

[Embodiment of Electronic Pen Cartridge 3]

FIG. 2 illustrates views of an example of a configuration of the electronic pen cartridge 3 in comparison with a refill of a commercially-available knock-type ballpoint pen. That is, FIG. 2A illustrates a refill 6 of a commercially-available knock-type ballpoint pen, while FIG. 2B illustrates an example of a configuration of the electronic pen cartridge 3 according to this embodiment. In this embodiment, as will be described later, the electronic pen cartridge 3 is the same in size as the refill 6 of the knock-type ballpoint pen and is configured to be compatible therewith.

FIG. 3 illustrates views of an example of a configuration of the pen tip side of the electronic pen cartridge 3 according to this embodiment. FIG. 3A is a view illustrating the appearance thereof, while FIG. 3B is a vertical cross-sectional view thereof. In addition, FIG. 4 illustrates exploded perspective views for describing an example of the configuration of the pen tip side of the electronic pen cartridge 3 according to this embodiment illustrated in FIG. 3.

As illustrated in FIG. 2A, the refill 6 of the commercially-available knock-type ballpoint pen has a well-known configuration in which a pen tip portion 61 with a ball disposed at its tip and a tubular ink storage portion 62 having a constant outer diameter are coupled to and integrated with each other by a tubular coupling portion 63 having a constant outer diameter. The pen tip portion 61 has a tubular shape and is tapered on the tip side thereof. The maximum outer diameter of the pen tip portion 61 is R1 which is smaller than a diameter R0 of the opening 2b of the pen housing 2. The coupling portion 63 and the ink storage portion 62 have the same outer diameter R2. The outer diameter R2 is slightly larger than the maximum outer diameter R1 of the pen tip portion 61. For example, R2=2.2 mm. It is noted that the diameter R0 of the opening 2b of the pen housing 2 is R1<R0<R2.

Meanwhile, a housing 30 (hereinafter referred to as a cartridge housing 30) of the electronic pen cartridge 3 according to this embodiment has a configuration in which a front cap 32 is coupled to the pen tip side of a housing tubular portion 31, as illustrated in FIGS. 2B, 3A, and 3B. The front cap 32 is made of, for example, an insulating material such as a resin.

In this example, as illustrated in FIG. 2B, the housing tubular portion 31 has a configuration in which a resin pipe portion 31b is coupled to the rear end side of a metal pipe portion 31a opposite from the pen tip side. The metal pipe portion 31a is made of a conductive material, in this example, a conductive metal. The resin pipe portion 31b is made of an insulating material, in this example, a resin. The outer diameter of each of the metal pipe portion 31a and the resin pipe portion 31b of the housing tubular portion 31 is equal to the outer diameter R2. An end portion of the housing tubular portion 31 on the resin pipe portion 31b side serves as a fitting portion of the electronic pen cartridge 3 that is fitted to the fitting portion 43a in the pen housing 2 of the electronic pen 1.

In this example, the front cap 32 is formed in a tapered shape so as to gradually taper toward the pen tip side, as illustrated in FIGS. 2B and 3. That is, the front cap 32 has a diameter that gradually decreases toward the pen tip side. In this embodiment, as illustrated in FIG. 2B, the pen tip side of the front cap 32 with respect to the position close to the center in the axial direction of the front cap 32 has a diameter equal to or less than the diameter R0 of the opening 2b on the pen tip side of the pen housing 2. As illustrated in FIG. 3B, a hollow portion 30a is present inside the cartridge housing Further, as illustrated in FIG. 3B, the front cap 32 has an opening 32a (see FIG. 3B) having a diameter larger than a diameter of an axial center body 33. The opening 32a communicates with the hollow portion 30a of the cartridge housing 30.

The axial center body 33 of the electronic pen cartridge 3 according to this embodiment is made of a conductive member, in this example, a conductive metal. Further, as illustrated in FIG. 3B, the axial center body 33 is inserted into the cartridge housing 30 through the opening 32a of the front cap 32, and an end portion of the axial center body 33 on the side opposite from the pen tip side is detachably attached to a axial-center-body holding member 7 to be described later.

As illustrated in FIG. 3B, the axial center body 33, which is made of a conductive material, and the metal pipe portion 31a of the housing tubular portion 31 of the cartridge housing 30 are electrically separated (insulated) by the front cap 32, which is an insulating material.

In the case of this example, as illustrated in FIGS. 2A and 2B, the diameter of the pen tip side of the electronic pen cartridge 3 is set so as to be substantially equal to the diameter of the pen tip side of the refill 6 of the ballpoint pen. That is, as described above, the outer diameter of the housing tubular portion 31 of the cartridge housing 30 is equal to the outer diameter R2 of the ink storage portion 62 and the coupling portion 63 of the refill 6 of the commercially-available knock-type ballpoint pen. Moreover, the pen tip side of the front cap 32 with respect to the position close to the center in the axial direction of the tapered portion of the front cap 32 has a diameter equal to or less than the diameter R0 of the opening 2b on the pen tip side of the pen housing 2.

Further, as illustrated in FIGS. 2A and 2B, in the state in which the axial center body 33 is inserted from the opening 32a of the front cap 32 and attached to the electronic pen cartridge 3, the length from a tip portion of the axial center body 33 to the position where the outer diameter of the front cap 32 becomes the diameter R1 is set so as to be substantially equal to a length L1 in the axial direction of the pen tip portion 61 of the refill 6 of the commercially-available knock-type ballpoint pen. Moreover, as illustrated in FIGS. 2A and 2B, the length (total length) of the electronic pen cartridge 3 with the axial center body 33 attached thereto is selected to be equal to a total length L2 of the refill 6 of the ballpoint pen.

The electronic pen cartridge 3 having the configuration described above can be housed in the pen housing 2 by fitting the resin pipe portion 31b on the rear end side of the housing tubular portion 31 of the electronic pen cartridge 3 to the fitting portion 43a of the rotor 43 of the knock cam mechanism unit 4.

In the electronic pen 1 according to this embodiment, the user presses the end portion 42a of the knock bar 42 when the electronic pen 1 is used with a position detection device. In response, in the electronic pen 1, as illustrated in FIG. 1B, a tip portion 33a of the axial center body 33 and part of the pen tip side of the tapered portion of the front cap 32 project outward from the opening 2b of the pen housing 2.

That is, in this embodiment, as illustrated in FIG. 1B, not only the tip portion of the axial center body 33 attached to the electronic pen cartridge 3 but also part of the pen tip side of the front cap 32 are configured so as to project outward from the opening 2b of the pen housing 2 of the electronic pen 1. In this state, the user of the electronic pen 1 performs an operation of inputting an indicated position on a position detection sensor of the position detection device.

When the use of the electronic pen 1 ends, the end portion 42a of the knock bar 42 is pressed again, so that the entire electronic pen cartridge 3 can be housed in the hollow portion 2a of the pen housing 2 as illustrated in FIG. 1A. At this time, the entire electronic pen cartridge 3 is housed in the hollow portion 2a of the pen housing 2, and the tip portion 33a of the axial center body 33 of the electronic pen cartridge 3 is protected by the pen housing 2.

As indicated by dotted lines in FIGS. 2B and 3A, the axial-center-body holding member 7, a pen-pressure detection unit 8, a printed circuit board 9, and a capacitor 10 are disposed so as to be aligned and housed in the hollow portion 30a of the cartridge housing 30 in order from the pen tip side in the axial direction. An electronic circuit including a signal transmission circuit is mounted on the printed circuit board 9. The capacitor 10 is an example of a power storage device for supplying a power supply voltage. The electronic circuit mounted on the printed circuit board 9 includes a charging circuit for supplying a charging current to the capacitor 10. In this example, the capacitor 10 includes, for example, an electric double layer capacitor.

Further, in this embodiment, as illustrated in FIG. 2B, a coil 11 is disposed on an outer peripheral portion of the resin pipe portion 31b on the rear end side of the housing tubular portion 31 of the cartridge housing 30. An induced current is excited in the coil 11 when an alternating-current magnetic field is externally supplied. In this example, the coil 11 is directly wound around and attached to a portion of the resin pipe portion 31b except for the end portion of the resin pipe portion 31b fitted to the fitting portion 43a of the rotor 43 of the knock cam mechanism unit 4 of the pen housing 2. It is noted that, as an alternative configuration, a hollow coil formed by winding the coil 11 in advance may be attached to the outer peripheral portion of the resin pipe portion 31b and may then be bonded and fixed by, for example, an adhesive.

In this case, since the coil 11 is wound around and disposed on the resin pipe portion 31b, which is an insulating member, eddy current is not generated in the resin pipe portion 31b due to the applied magnetic field. Therefore, the capacitor 10 as an example of the power storage device is efficiently charged by the induced current induced in the coil 11.

Further, one end 11a of the coil 11, which is disposed on the resin pipe portion 31b, is connected to an earth electrode of the electronic circuit disposed on the printed circuit board 9, while another end 11b of the coil 11 is connected to the charging circuit included in the electronic circuit.

FIG. 2C is an enlarged cross-sectional view of the vicinity of the resin pipe portion 31b on the rear end side of the cartridge housing 30. As illustrated in FIG. 2C, one electrode 10a of the capacitor 10 is connected to the earth electrode of the printed circuit board 9. In this example, the earth electrode of the printed circuit board 9 is electrically connected to the metal pipe portion 31a of the cartridge housing 30. Therefore, as illustrated in FIGS. 2B and 2C, the one end 11a of the coil 11 is electrically connected to the metal pipe portion 31a, for example, by soldering.

Further, as illustrated in FIG. 2C, in this example, the end portion of the resin pipe portion 31b of the cartridge housing 30 fitted to the fitting portion 43a is provided with an electrode conductor 12 which is disposed from an inner wall surface of the resin pipe portion 31b to an outer peripheral surface thereof. The other end 11b of the coil 11 is electrically connected to the outer peripheral surface side of the electrode conductor 12 by, for example, soldering. In addition, the inner wall surface side of the electrode conductor 12 is connected to another electrode of the capacitor 10 through a rectifier circuit 13, which is an example of the charging circuit. Further, as illustrated in FIG. 2C, a connection point between the rectifier circuit 13 and the other electrode 10b of the capacitor 10 is electrically connected to a voltage conversion circuit 14 of the electronic circuit, as will be described later.

Further, in this embodiment, as illustrated in FIG. 3B, a board holder 300 is housed in the hollow portion 30a of the cartridge housing 30. The board holder 300 includes a board mounting base portion 301 on which the printed circuit board 9 is mounted.

The board holder 300 is made of an insulating resin and includes a pen-pressure detection unit holding portion 302 on the side opposite from the board mounting base portion 301 side in the longitudinal direction, which is the axial direction of the electronic pen cartridge 3. The pen-pressure detection unit holding portion 302 houses and holds the pen-pressure detection unit 8. As illustrated in FIG. 3B, the board holder 300 is configured such that, when the board holder 300 is housed in the hollow portion of the cartridge housing 30, the pen-pressure detection unit holding portion 302 and the board mounting base portion 301 become continuous in the longitudinal direction, which is the axial direction of the electronic pen cartridge 3. The pen-pressure detection unit holding portion 302 has a tubular shape having a hollow portion that houses a plurality of components of the pen-pressure detection unit 8 in its inner hollow portion. The board mounting base portion 301 has a boat-like shape on which the printed circuit board 9 is mounted and held, and has a shape as if a tubular body is cut in substantially half in the axial direction.

The board holder 300 is housed in the cartridge housing 30 such that the pen-pressure detection unit holding portion 302 is located on the pen tip side. Further, the axial-center-body holding member 7, which fits around and holds the axial center body 33, is coupled to the pen-pressure detection unit 8, which is held by the pen-pressure detection unit holding portion 302, and a pressure (pen pressure) applied to the axial center body 33 is transmitted to the pen-pressure detection unit 8.

In this embodiment, the outer diameter of the pen-pressure detection unit holding portion 302 of the board holder 300 is selected to be equal to or slightly larger than the inner diameter of the front cap 32. Further, as illustrated in FIG. 3B, part of the pen-pressure detection unit holding portion 302 of the board holder 300 is fitted to part of the front cap 32. Accordingly, the position of the board holder 300 is restricted so as to prevent the board holder 300 from moving in the axial direction inside the cartridge housing 30.

As illustrated in FIGS. 3B and 4, the axial-center-body holding member 7, which fits around and holds the axial center body 33, includes a conductive elastic member 71, a axial-center-body holder 72, a coil spring 73, and a conductor terminal member 74. In this embodiment, as illustrated in FIG. 3B, the axial center body 33 is fitted to the axial-center-body holder 72, which is made of a conductive material, via the conductive elastic member 71. In this way, the axial center body 33 is coupled to and held by the axial-center-body holder 72. The axial-center-body holding member 7 also serves as a transmission member for transmitting a pen pressure applied to the axial center body 33, to the pen-pressure detection unit 8.

Further, the axial-center-body holder 72 is fitted to a holding member 83 of the pen-pressure detection unit 8, which is held by the pen-pressure detection unit holding portion 302, so that a pressure (pen pressure) applied to the axial center body 33 is transmitted to the pen-pressure detection unit 8. In this case, the axial-center-body holder 72 is configured so as to be always biased toward the axial center body 33 side with respect to the board holder 300 by the coil spring 73. The coil spring 73 is an example of an elastic member made of a conductive material such as a conductive metal and is disposed between the axial-center-body holder 72 and the board holder 300. It is noted that the coil spring 73, together with the conductor terminal member 74, constitutes an electrical connection member for transmitting a signal from the signal transmission circuit of the electronic circuit disposed on the printed circuit board 9 to the axial center body 33.

FIG. 4A is an exploded perspective view of a portion including the axial center body 33, the conductive elastic member 71, the axial-center-body holder 72, the coil spring 73, the conductor terminal member 74, and the pen-pressure detection unit holding portion 302 of the board holder 300.

The conductive elastic member 71 is made of, for example, conductive rubber, and is formed in a tubular shape with a through-hole 71a to which an end portion of the axial center body 33 opposite from the tip portion 33a is fitted. The axial center body 33 side of the conductive elastic member 71 has a thin portion having an outer diameter smaller than the outer diameters of the other portions and also serves as a grip portion 711 with slits 712 formed therein to facilitate gripping of the axial center body 33.

With this configuration, the axial center body 33 is gripped by arc-shaped portions of the grip portion 711 that are two thin portions in which the slits 712 are formed. Therefore, the axial center body 33 can easily be inserted and fitted to the grip portion 711 of the conductive elastic member 71. Moreover, the axial center body 33 can easily be pulled out from the conductive elastic member 71 by being pulled with a predetermined force.

The axial-center-body holder 72 is made of a conductive material, for example, SUS (Steel Special Use Stainless). A housing fitting portion 721 and a rod-shaped portion 722 are formed integrally, constituting the axial-center-body holder 72. The housing fitting portion 721 has a recessed hole 721a which fits around and houses the conductive elastic member 71. The rod-shaped portion 722 is fitted to the holding member 83, which will be described later, of the pen-pressure detection unit 8.

After the conductive coil spring 73 is attached to the rod-shaped portion 722 of the axial-center-body holder 72, which houses the conductive elastic member 71 as described above, the rod-shaped portion 722 of the axial-center-body holder 72 is fitted to the holding member 83 of the pen-pressure detection unit 8, which is held by the pen-pressure detection unit holding portion 302 of the board holder 300.

In this case, in the electronic pen cartridge 3 according to this embodiment, it is necessary to supply a transmission signal from the signal transmission circuit of the electronic circuit configured on the printed circuit board 9, to the axial center body 33. In this embodiment, the coil spring 73, which is disposed between the axial-center-body holder 72 and the pen-pressure detection unit holding portion 302 of the board holder 300 and made of a conductive material, and the conductor terminal member 74 (see FIG. 4B), which is disposed in the pen-pressure detection unit holding portion 302 of the board holder 300, constitute the electrical connection member, and the electrical connection member realizes an electrical connection for supplying a signal from the signal transmission circuit of the printed circuit board 9.

The conductor terminal member 74 is made of a conductive material, for example, SUS, and includes a contact plate portion 741, as illustrated in FIGS. 4A and 4B. The contact plate portion 741 covers an opening portion 302a side of the pen-pressure detection unit holding portion 302 of the board holder 300 and has a through-hole 741a through which the rod-shaped portion 722 of the axial-center-body holder 72 is inserted. Moreover, the conductor terminal member 74 has an extending portion 742 which extends to the board mounting base portion 301 over the pen-pressure detection unit holding portion 302 of the board holder 300. Further, with the conductor terminal member 74 attached to the pen-pressure detection unit holding portion 302 of the board holder 300, as illustrated in FIG. 3B, a terminal portion 742a at a tip of the extending portion 742, which extends from the conductor terminal member 74, is in contact with and, for example, is soldered to a conductor on the back surface side of the printed circuit board 9, which is mounted on the board mounting base portion 301 of the board holder 300. This configuration electrically connects the conductor terminal member 74 to the signal transmission circuit disposed on the printed circuit board 9.

The rod-shaped portion 722 of the axial-center-body holder 72 to which the conductive elastic member 71 is fitted is inserted from the through-hole 741a of the contact plate portion 741 of the conductor terminal member 74 into the hollow portion of the pen-pressure detection unit holding portion 302 of the board holder 300 and fitted to the pen-pressure detection unit holding portion 302 with the coil spring 73 interposed therebetween. The inner diameter of the coil spring 73 is larger than the outer diameter of the rod-shaped portion 722 of the axial-center-body holder 72.

Therefore, the coil spring 73 elastically contacts the axial-center-body holder 72 and abuts and elastically contacts the contact plate portion 741 of the conductor terminal member 74. Since the coil spring 73 is made of a conductive material and the conductive elastic member 71 and the axial-center-body holder 72 have conductivity, the conductive elastic member 71, which is fitted to the axial-center-body holder 72, is electrically connected to the circuit portion of the printed circuit board 9 via the coil spring 73 and the conductor terminal member 74.

Further, the axial center body 33 is, as described above, inserted and fitted to the through-hole 71a of the conductive elastic member 71, which is fitted to the axial-center-body holder 72 housed in the cartridge housing 30 as described above, and held by the axial-center-body holder 72 via the conductive elastic member 71. In this state, the axial center body 33 is electrically connected to the signal transmission circuit of the printed circuit board 9, and a signal from the signal transmission circuit is supplied to the axial center body 33.

Next, configurations of the pen-pressure detection unit holding portion 302 of the board holder 300 and the pen-pressure detection unit 8, and the fitting of the holding member 83 of the pen-pressure detection unit 8 and the axial-center-body holder 72 will be described.

The pen-pressure detection unit 8 is housed in the pen-pressure detection unit holding portion 302 and is configured as illustrated in FIG. 3B, thereby forming a pen-pressure detection module. Further, in the state in which the axial center body 33 is coupled to the pen-pressure detection module via the axial-center-body holder 72, the pen-pressure detection unit 8 of the pen-pressure detection module detects a pen pressure applied to the tip portion 33a of the axial center body 33. In this case, when some of the components of the pen-pressure detection unit 8 constituting the pen-pressure detection module move in the axial direction together with the axial center body 33 and the axial-center-body holder 72 in response to a pen pressure applied to the tip portion 33a of the axial center body 33, the pen-pressure detection module detects the pen pressure.

The pen-pressure detection unit 8 in this example uses a variable capacitor whose capacitance changes according to a pen pressure applied to the axial center body 33, and includes a plurality of components including a dielectric 81, a terminal member 82, the holding member 83, a conductive member 84, and an elastic member 85, as illustrated in FIG. 3B.

In the state in which the axial-center-body holder 72 is fitted to the pen-pressure detection unit holding portion 302 of the board holder 300 as described above, the axial center body 33 is press-fitted to the through-hole 71a of the conductive elastic member 71, which is fitted to the axial-center-body holder 72. In this way, as described above, the axial center body 33 is firmly held by the conductive elastic member 71 against the axial-center-body holder 72. It is noted that the axial center body 33 can be pulled out in the direction of the tip portion 33a from the state of being fitted to and held by the axial-center-body holder 72 and is replaceable as described above.

In the electronic pen cartridge 3, when a pressure is applied to the tip portion 33a of the axial center body 33, the axial center body 33 is displaced toward the rear end side in the axial direction according to the pressure. Due to this displacement, the holding member 83 in the pen-pressure detection unit holding portion 302 is displaced toward the dielectric 81 side against an elastic biasing force of the elastic member 85. As a result, the conductive member 84, which is fitted to the holding member 83, is displaced toward the dielectric 81 side, and not only the distance between the conductive member 84 and the dielectric 81 but also the area of contact between the conductive member 84 and the dielectric 81 change according to the pressure applied to the axial center body 33.

Accordingly, the capacitance of the variable capacitor formed between the terminal member 82, which constitutes a first electrode, and the conductive member 84, which constitutes a second electrode, changes according to the pressure applied to the axial center body 33. The change in the capacitance of this variable capacitor is detected by the electronic circuit disposed on the printed circuit board 9, so that the pen pressure is detected.

It is noted that the pen-pressure detection unit 8 is not limited to the one having the configuration described above. For example, the variable capacitor may be configured using a semiconductor chip including a MEMS (Micro Electro Mechanical Systems) element (for example, see Patent Document (Japanese Patent Laid-Open No. 2013-161307)).

The electronic pen 1 according to the embodiment is completed when the end portion of the resin pipe portion 31b on the rear end side of the cartridge housing 30 of the electronic pen cartridge 3 configured as described above is fitted to the fitting portion 43a of the rotor 43 of the knock cam mechanism unit 4, which is disposed in the pen housing 2 of the electronic pen 1.

[Example of Configuration of Electronic Circuit of Electronic Pen Cartridge 3]

Figure 5:
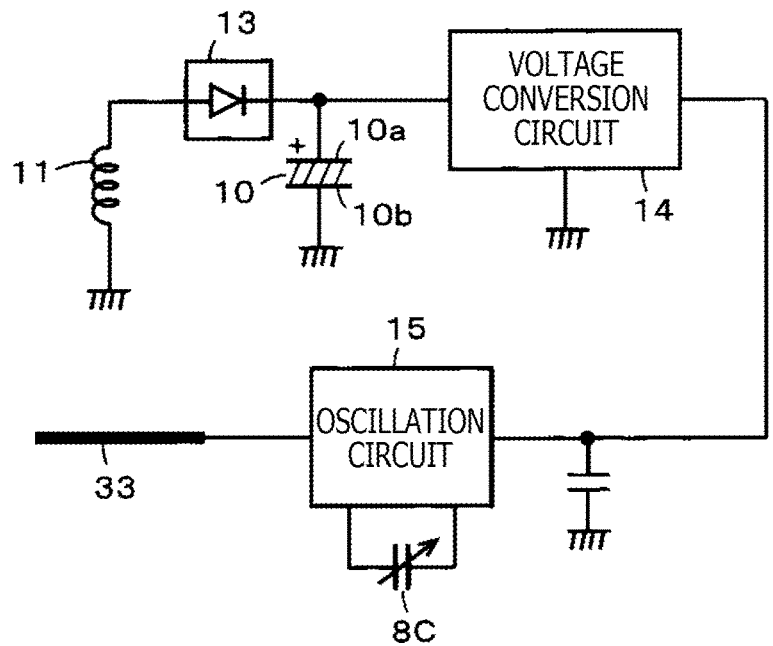
FIG. 5 is a diagram illustrating an example of a configuration of an electronic circuit of the electronic pen cartridge according to the first embodiment of the present disclosure.

FIG. 5 illustrates an example of a configuration of the electronic circuit of the electronic pen cartridge 3 according to this embodiment configured as described above. As illustrated in FIG. 5, the electronic circuit in this example includes the coil 11, which is disposed on the outer peripheral portion of the resin pipe portion 31b of the cartridge housing 30, the rectifier circuit 13, the capacitor 10, the voltage conversion circuit 14, a signal transmission circuit 15, and the conductive axial center body 33.

As illustrated in FIG. 2C, the coil 11, which is disposed on the outer peripheral portion of the resin pipe portion 31b of the cartridge housing 30, is connected to the capacitor 10 and the voltage conversion circuit 14 via the rectifier circuit 13.

When the coil 11 is placed in an alternating-current magnetic field, such as upon the placement on a charging tray to be described later, an induced current is induced in the coil 11 through electromagnetic induction, and the induced current is rectified by the rectifier circuit 13. Then, the capacitor 10 is charged by the rectified current from the rectifier circuit 13.

The voltage conversion circuit 14 converts the voltage stored in the capacitor 10 into a certain voltage and supplies the voltage as a power supply to the signal transmission circuit 15. The voltage conversion circuit 14 may be of a step-down type such as the one that makes the voltage lower than the voltage across the capacitor 10 or may be of a step-up type such as the one that makes the voltage higher than the voltage across the capacitor 10. Alternatively, the voltage conversion circuit 14 may be of a step-up/step-down type that operates as a step-down circuit when the voltage across the capacitor 10 is higher than the certain voltage and that operates as a step-up circuit when the voltage across the capacitor 10 is lower than the certain voltage.

In this example, the signal transmission circuit 15 includes an oscillation circuit and generates a signal whose frequency changes according to the capacity of a variable capacitor 8C which is included in the pen-pressure detection unit 8, and supplies the generated signal to the axial center body 33. The oscillation circuit of the signal transmission circuit 15 includes, for example, an LC oscillation circuit using resonance by a coil and a capacitor.

A signal from the signal transmission circuit 15 is radiated from the axial center body 33 as an electric field based on the signal and is detected by the position detection sensor of a capacitance type. A position detection circuit connected to the position detection sensor detects the coordinates of the position indicated by the axial center body 33 of the electronic pen cartridge 3 of the electronic pen 1, from the position on the position detection sensor at which the detected signal is obtained. In addition, the position detection circuit detects a pen pressure applied to the axial center body 33, from the frequency of the detected signal.

[Example of Configuration of Electronic Pen Charging Tray]

An electronic pen charging tray will be described. The electronic pen charging tray charges the capacitor 10, which is an example of the power storage device incorporated in the electronic pen cartridge 3 housed in the pen housing 2 of the electronic pen 1 according to the embodiment described above. The electronic pen charging tray in this example is configured such that just placing the electronic pen 1 according to this embodiment on the electronic pen charging tray can charge the capacitor 10 as an example of the power storage device incorporated in the electronic pen cartridge 3.

Figure 6:
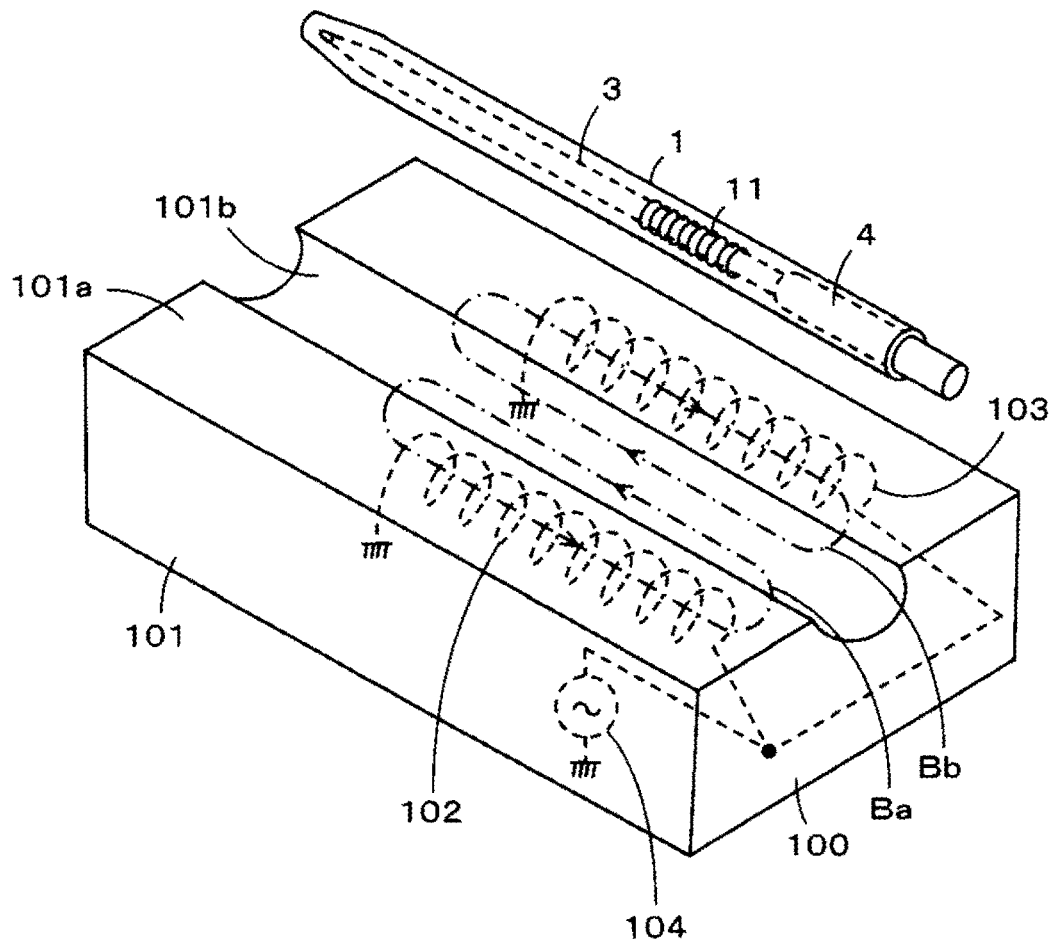
FIG. 6 is a diagram illustrating an example of a configuration of a charging tray according to an embodiment, which charges the electronic pen according to the embodiment in which the electronic pen cartridge according to the first embodiment of the present disclosure is mounted.

FIG. 6 is a diagram for describing an electronic pen charging tray according to an embodiment. That is, an electronic pen charging tray 100 in the example of FIG. 6 includes, in this example, a rectangular parallelepiped tray housing 101 which is thicker than the pen housing 2 of the electronic pen 1. In this example, the length in the long-side direction of an upper surface 101*a* of the tray housing 101 is greater than the length in the axial direction of the electronic pen 1, and the length in the short-side direction thereof is greater than the thickness of the electronic pen 1.

Further, in this example, a recess 101*b* which is formed throughout the long-side direction of the upper surface 101*a* of the tray housing 101 is positioned in a central portion in the short-side direction of the upper surface 101*a* of the tray housing 101. The recess 101*b* is where the electronic pen 1 is placed, and the width of the recess 101*b* has a length greater than the diameter of the pen housing 2 of the electronic pen 1.

Further, in this example, magnetic-field generation coils 102 and 103 are arranged on respective sides of the recess 101*b* along the direction in which the recess 101*b* is formed in the tray housing 101. In this case, as illustrated in FIG. 6, the magnetic-field generation coils 102 and 103 are arranged such that the directions of the flows of magnetic fluxes Ba and Bb in the magnetic fields which are generated by the alternating current supplied to the magnetic-field generation coils 102 and 103 are along the direction in which the recess 101*b* is formed. That is, the magnetic-field generation coils 102 and 103 are arranged such that the direction of the winding center of each of the coils 102 and 103 is along the direction in which the recess 101*b* is formed (the long-side direction of the upper surface 101*a* of the tray housing 101).

In addition, in this example, the magnetic-field generation coils 102 and 103 are arranged such that the magnetic fluxes Ba and Bb in the magnetic fields formed by the magnetic-field generation coils 102 and 103 flow in the same direction and are added and such that an alternating-current signal is supplied thereto.

Moreover, the depth of the recess 101*b* is set such that, when the electronic pen 1 is placed in the recess 101*b*, the magnetic fluxes Ba and Bb in the magnetic fields generated by the alternating current supplied to the magnetic-field generation coils 102 and 103 efficiently interlink the coil 11, which is disposed in the rear end portion of the cartridge housing 30 of the electronic pen cartridge 3.

In addition, as illustrated in FIG. 6, an alternating-current signal generation circuit 104 which supplies the alternating current to the magnetic-field generation coils 102 and 103 is disposed inside the tray housing 101. It is noted that, although not illustrated in FIG. 6, the electronic pen charging tray 100 is connected to an AC (Alternating Current) plug fitted to an outlet of a commercial alternating-current power supply and includes a power-supply switch. When the power-supply switch is turned on, a power supply voltage is supplied to the alternating-current signal generation circuit 104. This causes the alternating current to flow through the magnetic-field generation coils 102 and 103, thereby generating the charging alternating-current magnetic fields that generate the magnetic fluxes Ba and Bb.

In order to charge the electronic pen 1 using the electronic pen charging tray 100 configured as described above, the electronic pen 1 is placed in the recess 101*b* of the electronic pen charging tray 100, and then, the power-supply switch is turned on. In response, the alternating-current signal from the alternating-current signal generation circuit 104 flows through the magnetic-field generation coils 102 and 103, generating the charging magnetic fields in which the magnetic fluxes Ba and Bb interlink the coil 11 disposed in the electronic pen cartridge 3 of the electronic pen 1 placed in the recess 101*b*.

Accordingly, induced current is induced in the coil 11 of the electronic pen cartridge 3 of the electronic pen 1, and the capacitor 10 as an example of the power storage device in the cartridge housing 30 of the electronic pen cartridge 3 is charged by the induced current. As a result of this charging, the electronic pen cartridge 3 of the electronic pen 1 can perform active capacitive operation.

It is noted that, although the electronic pen charging tray 100 in the above-described example includes the two magnetic-field generation coils 102 and 103, the electronic pen charging tray 100 may include a single magnetic-field generation coil. Moreover, the charging device for the power storage device of the electronic pen cartridge 3 of the electronic pen 1 is not limited to the tray as in the example of FIG. 6 and may have, for example, a shape of a penholder into which the electronic pen is inserted. In this case, the magnetic-field generation coil is disposed so as to form the magnetic flux that interlinks the coil 11, which is disposed on the resin pipe portion 31*b* of the cartridge housing 30 of the electronic pen cartridge 3, when the electronic pen 1 is inserted into the penholder and stands therein.

[Effects of Electronic Pen and Electronic Pen Cartridge According to First Embodiment]

As described above, the electronic pen cartridge 3 according to the first embodiment described above can be configured so as to maintain compatibility with a refill of a stationery ballpoint pen. Further, the electronic pen cartridge 3 according to the first embodiment described above is configured such that the power storage device housed in the cartridge housing 30 is charged by the induced current induced in the coil wound around the rear end portion of the cartridge housing 30. This eliminates the need for frequent battery replacement that is required in the case of using a primary battery.

Further, with the electronic pen cartridge 3 according to the first embodiment described above, the power storage device incorporated in the electronic pen cartridge 3 can be charged just by placing the electronic pen 1 in an environment where an external magnetic field is applied to the coil wound around the rear end portion of the cartridge housing 30, meaning that charging is possible in the state in which the electronic pen cartridge 3 is housed in the pen housing 2 of the electronic pen 1. Moreover, there is an effect that a housing of a stationery ballpoint pen can be used as it is since the pen housing 2 of the electronic pen 1 does not require a special configuration such as a charging terminal.

Second Embodiment

An electronic pen of an active capacitance type according to a second embodiment is an example of a two-way communication type electronic pen that receives a signal from the position detection sensor configured to detect the position indicated by the electronic pen, and that transmits a signal in a format based on a request of the received signal.

In this type of two-way communication type electronic pen, the position of a reception unit for receiving a signal from the position detection sensor is important. In the case of an electronic pen of the capacitance type, a signal transmitted from the position detection sensor is based on an electric field that can be received through capacitive coupling, and its travel distance is significantly small. Therefore, the reception unit of the two-way communication type electronic pen should be disposed at a position close to the pen tip so as to be able to receive a signal from the position detection sensor with high intensity.

Therefore, in this second embodiment, the electronic pen cartridge is configure to be optimal for use in the above-described two-way communication type electronic pen. That is, in the embodiment described below, the electronic pen cartridge includes a reception unit that receives a signal from the position detection sensor. While electrical insulation from the axial center body as a center electrode made of a conductive material is taken into account, this reception unit includes a peripheral electrode made of a tubular conductor disposed so as to surround and cover the center electrode up to the vicinity of a tip portion of the center electrode.

Recently, it has been proposed that the tilt angle of an electronic pen relative to a position detection sensor surface (the angle between the axial direction of the electronic pen and the position detection sensor surface; hereinafter abbreviated as the tilt angle of the electronic pen) is detected by a position detection device and that the detected tilt angle is reflected to, for example, the thickness of the trajectory (writing trace) indicated by the electronic pen. In the electronic pen cartridge according to the second embodiment, the peripheral electrode is also configured to be usable for the detection of the tilt angle of the electronic pen.

Moreover, in this second embodiment, the peripheral electrode also serves as a shield electrode for the center electrode that transmits a position detection signal.

Hereinafter, an example of a configuration of the electronic pen and the electronic pen cartridge according to the second embodiment will be described with reference to FIGS. 7 to 11. It is noted that the electronic pen and the electronic pen cartridge according to the second embodiment described below have a similar knock-type ballpoint pen configuration to that of the first embodiment and that the same pen housing as the pen housing 2 according to the first embodiment is used as it is. Further, the electronic pen cartridge according to the second embodiment is different from the electronic pen cartridge 3 according to the first embodiment only in the configuration on the pen tip side, and the other configurations are similar to the electronic pen cartridge 3 according to the first embodiment. In the following description of the electronic pen and the electronic pen cartridge according to the second embodiment, the same components as those in the first embodiment are denoted by the same reference signs, and the detailed description thereof is omitted.

Figure 8A:
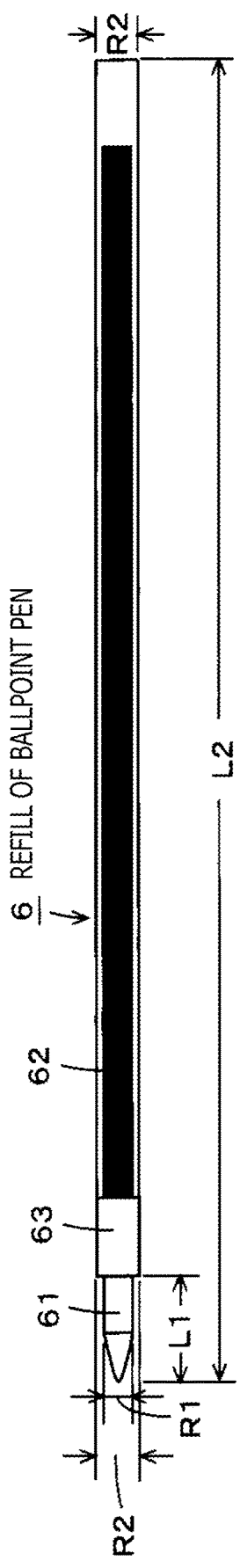
FIGS. 8A and 8B illustrate views for describing the electronic pen cartridge according to the second embodiment of the present disclosure.
Figure 8B:
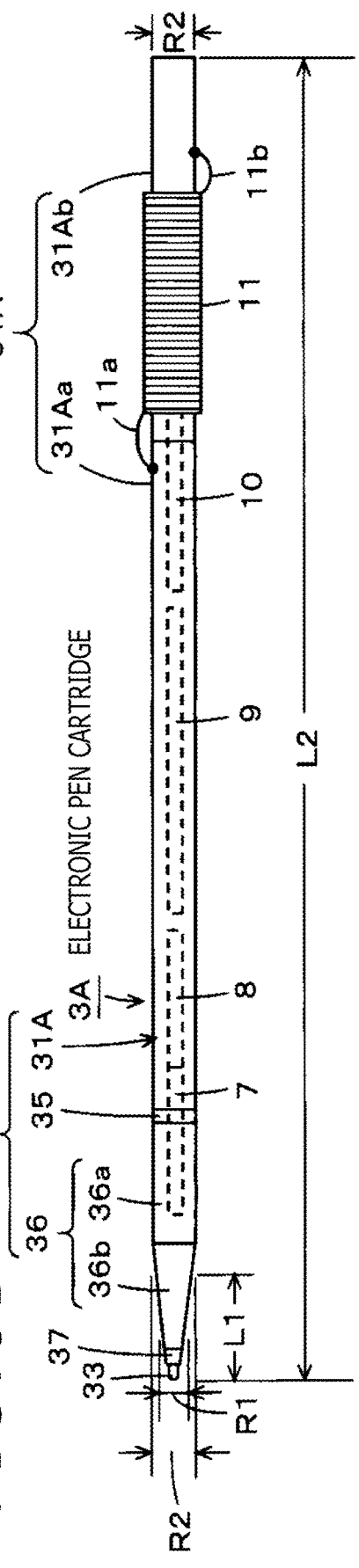

FIG. 7 illustrates views of an example of a configuration of an electronic pen 1A according to the second embodiment of the present disclosure, and correspond to the example of the configuration of the electronic pen 1 according to the first embodiment illustrated in FIG. 1. In addition, FIGS. 8A and 8B are views illustrating an example of a configuration of an electronic pen cartridge 3A according to the second embodiment in comparison with a refill of a commercially-available knock-type ballpoint pen, and correspond to the examples of the configurations illustrated in FIGS. 2A and 2B for the electronic pen cartridge 3 according to the first embodiment. It is noted that, since the configuration of the rear end side of the second electronic pen cartridge 3A has a similar configuration to that of the rear end side of the electronic pen cartridge 3 illustrated in FIG. 2C, the illustration thereof is omitted in FIG. 8. In addition, FIG. 9 illustrates views of an example of a configuration of the pen tip side of the electronic pen cartridge 3A according to the second embodiment. FIG. 9A is a view illustrating the appearance thereof, while FIG. 9B is a vertical cross-sectional view thereof.

In the electronic pen cartridge 3A according to the second embodiment, as illustrated in FIGS. 8B, 9A, and 9B, a peripheral electrode 36 which is made of a conductive member, for example, a conductive metal is coupled to the pen tip side of a housing tubular portion 31A via a tubular coupling member 35, and a front cap 37 is coupled to the pen tip side of the peripheral electrode 36. In this way, a cartridge housing 30A is formed.

In this example, as illustrated in FIG. 8B, the housing tubular portion 31A has a configuration in which a resin pipe portion 31Ab is coupled to the rear end side of a metal pipe portion 31Aa opposite from the pen tip side of the metal pipe portion 31Aa, as with the housing tubular portion 31 of the cartridge housing 30 of the electronic pen cartridge 3 according to the first embodiment. Further, the coil 11 is wound around the resin pipe portion 31Ab, and the one end 11a and the other end 11b of the coil 11 are connected to an electronic circuit in the housing tubular portion 31A, as with the first embodiment described above.

Further, in this second embodiment, the pen tip side of the metal pipe portion 31Aa of the housing tubular portion 31A is coupled to the peripheral electrode 36 via the tubular coupling member 35. The tubular coupling member 35 also serves as an insulator between the metal pipe portion 31Aa of the housing tubular portion 31A and the peripheral electrode 36. Further, an end portion of the electronic pen cartridge 3A on the resin pipe portion 31Ab side serves as a fitting portion fitted to the fitting portion 43a in the pen housing 2.

In this example, as illustrated in FIGS. 8 and 9, the peripheral electrode 36 has a shape including a tubular-shaped portion 36a and a tapered portion 36b. The tubular-shaped portion 36a has the constant outer diameter R2. The tapered portion 36b is formed in a tapered shape so as to gradually taper toward the pen tip side. The metal pipe portion 31Aa of the housing tubular portion 31A has a tubular shape having an outer diameter equal to the outer diameter R2 of the tubular-shaped portion 36a of the peripheral electrode 36.

The tubular coupling member 35, which is made of an insulating material, in this example, a resin, has a tubular body as illustrated in FIG. 9B and includes a ring-shaped flange portion 35F. The ring-shaped flange portion 35F projects from the outer peripheral surface of the tubular coupling member 35 at a position close to the center in the axial direction thereof. The ring-shaped flange portion 35F has a predetermined width W (see FIGS. 9A and 9B) in the axial direction. An end surface of the ring-shaped flange portion 35F is, as illustrated in FIGS. 9A and 9B, flush with the housing tubular portion 31A and the peripheral electrode 36 without a difference in level, constituting part of the cartridge housing 30A.

Further, the pen tip side of the tubular coupling member 35 on one side in the axial direction with respect to the ring-shaped flange portion 35F serves as a first fitting tubular portion The first fitting tubular portion 35a is fitted to the tubular-shaped portion 36a of the peripheral electrode 36. The rear end side of the tubular coupling member 35 in the axial direction with respect to the ring-shaped flange portion 35F serves as a second fitting tubular portion 35b. The second fitting tubular portion 35b is fitted to the metal pipe portion 31Aa of the housing tubular portion 31A.

In the state in which the metal pipe portion 31Aa of the housing tubular portion 31A and the peripheral electrode 36 are inserted and fitted to the tubular coupling member 35, and the front cap 37 is coupled to the pen tip side of the peripheral electrode 36, the single tubular cartridge housing 30A is formed as illustrated in FIGS. 8B, 9A, and 9B. At this time, as described above, the outer peripheral surface of the metal pipe portion 31Aa of the housing tubular portion 31A, the outer peripheral surface of the peripheral electrode 36, and the end surface of the ring-shaped flange portion 35F of the tubular coupling member 35 are flush with each other. Further, the metal pipe portion 31Aa of the housing tubular portion 31A, which is made of a conductive material, and the peripheral electrode 36 are not in contact with each other and are electrically separated (insulated) from each other due to the presence of the ring-shaped flange portion 35F of the tubular coupling member 35.

As illustrated in FIG. 9B, a hollow portion 30Aa is present inside the cartridge housing 30A. The front cap 37, which is attached to the pen tip side of the peripheral electrode 36, is made of an insulating material, and has an opening 37a (see FIG. 9B) on the tip side thereof. The opening 37a has a diameter larger than the diameter of the axial center body 33 as the center electrode. The opening 37a communicates with the hollow portion 30Aa of the cartridge housing Further, as illustrated in FIG. 9B, the axial center body 33 as the center electrode is inserted into the cartridge housing 30A from the opening 37a of the front cap 37, and the end portion of the axial center body 33 on the side opposite from the pen tip side is detachably attached to the axial-center-body holding member 7.

As illustrated in FIG. 9B, the axial center body 33, which is made of a conductive material, and the peripheral electrode 36 are electrically separated (insulated) by the front cap 37, which is an insulating material. In the electronic pen cartridge 3A according to the second embodiment, as illustrated in FIG. 9B, when the axial center body 33 as the center electrode is attached, the peripheral electrode 36 is disposed so as to surround the rear end side of the axial center body 33 with respect to the tip portion 33a, which is the pen tip of the axial center body 33.

In the case of this second embodiment as well, as illustrated in FIGS. 8A and 8B, the dimension of the pen tip side of the electronic pen cartridge 3A is set so as to be substantially equal to the dimension of the pen tip side of the refill 6 of the ballpoint pen. That is, as illustrated in FIG. 8B, the outer diameter of each of the housing tubular portion 31A and the tubular-shaped portion 36a of the peripheral electrode 36 of the cartridge housing 30A is equal to the outer diameter R2 of each of the ink storage portion 62 and the coupling portion 63 of the refill 6 of the commercially-available knock-type ballpoint pen.

Further, the tapered portion 36b on the pen tip side of the peripheral electrode 36 of the cartridge housing 30A has a diameter that gradually decreases toward the pen tip side. In this embodiment, as illustrated in FIG. 8B, the pen tip side of the tapered portion 36b with respect to the position close to the center in the axial direction of the tapered portion 36b has a diameter equal to or less than the diameter R0 of the opening 2b on the pen tip side of the pen housing 2.

Further, in the state in which the axial center body 33 is inserted from the opening 37a of the front cap 37 and attached to the electronic pen cartridge 3A, the length from the tip portion of the axial center body 33 to the position where the outer diameter of the tapered portion 36b of the peripheral electrode 36 becomes the diameter R1 is set so as to be substantially equal to the length L1 in the axial direction of the pen tip portion 61 of the refill 6 of the commercially-available knock-type ballpoint pen.

Moreover, as illustrated in FIGS. 8A and 8B, the length (total length) of the electronic pen cartridge 3A with the axial center body 33 attached thereto is selected to be equal to the total length L2 of the refill 6 of the ballpoint pen.

The electronic pen cartridge 3A having the configuration described above can be housed in the pen housing 2 by fitting the housing tubular portion 31A of the electronic pen cartridge 3A to the fitting portion 43a of the rotor 43 of the knock cam mechanism unit 4. In the electronic pen 1A according to the second embodiment as well, the user presses the end portion 42a of the knock bar 42 when the electronic pen 1A according to the second embodiment is used with the position detection device. In response, in the electronic pen 1A, as illustrated in FIG. 7B, the tip portion 33a of the axial center body 33, part of the front cap 37, and part of the pen tip side of the tapered portion 36b of the peripheral electrode 36 project outward from the opening 2b of the pen housing 2.

That is, in this second embodiment, as illustrated in FIG. 7B, not only the tip portion of the axial center body 33, which is attached to the electronic pen cartridge 3A, but also part of the pen tip side of the peripheral electrode 36, which is configured so as to surround the axial center body 33, are configured so as to project outward from the opening 2b of the pen housing 2 of the electronic pen 1A. In this state, the user of the electronic pen 1A performs an operation of inputting an indicated position on the position detection sensor of the position detection device. Therefore, since the axial center body 33 as the center electrode and the peripheral electrode 36 project outward from the opening of the pen housing 2, the axial center body 33 and the peripheral electrode 36 are strongly electric-field coupled to the position detection sensor.

When the use of the electronic pen 1A ends, the end portion 42a of the knock bar 42 is pressed again, so that the entire electronic pen cartridge 3A can be housed in the hollow portion 2a of the pen housing 2 as illustrated in FIG. 7A. At this time, the entire electronic pen cartridge 3A is housed in the hollow portion 2a of the pen housing 2, and the tip portion 33a of the axial center body 33 of the electronic pen cartridge 3A is protected by the pen housing 2.

It is noted that, as indicated by dotted lines in FIGS. 8B and 9A, in this second embodiment as well, the axial-center-body holding member 7, the pen-pressure detection unit 8, the printed circuit board 9 on which the electronic circuit is mounted, and the capacitor 10 as an example of the power storage device for supplying the power supply voltage are disposed so as to be aligned and housed in the hollow portion 30Aa of the cartridge housing 30A in order from the pen tip side in the axial direction. Since the configurations of the axial-center-body holding member 7, the pen-pressure detection unit 8, the printed circuit board 9 on which the electronic circuit is mounted, and the capacitor 10 as an example of the power storage device for supplying the power supply voltage in the second embodiment are similar to those in the first embodiment, the description thereof is omitted.

It is noted that, as illustrated in FIG. 9B, the electrical connection between the peripheral electrode 36 and the circuit portion on the printed circuit board 9 uses a connection terminal conductor 16. The connection terminal conductor 16 penetrates the flange portion 35F of the tubular coupling member 35 and is disposed without being in contact with the metal pipe portion 31Aa of the housing tubular portion 31A. One end portion 16a of the connection terminal conductor 16 and the inner wall of the peripheral electrode 36 are in contact with each other and are electrically connected to each other. Another end portion 16b of the connection terminal conductor 16 is, as illustrated in FIG. 9B, electrically connected to a back surface 9b side of the printed circuit board 9.

[Example of Configuration of Electronic Circuit of Electronic Pen Cartridge 3A According to Second Embodiment]

Figure 10:
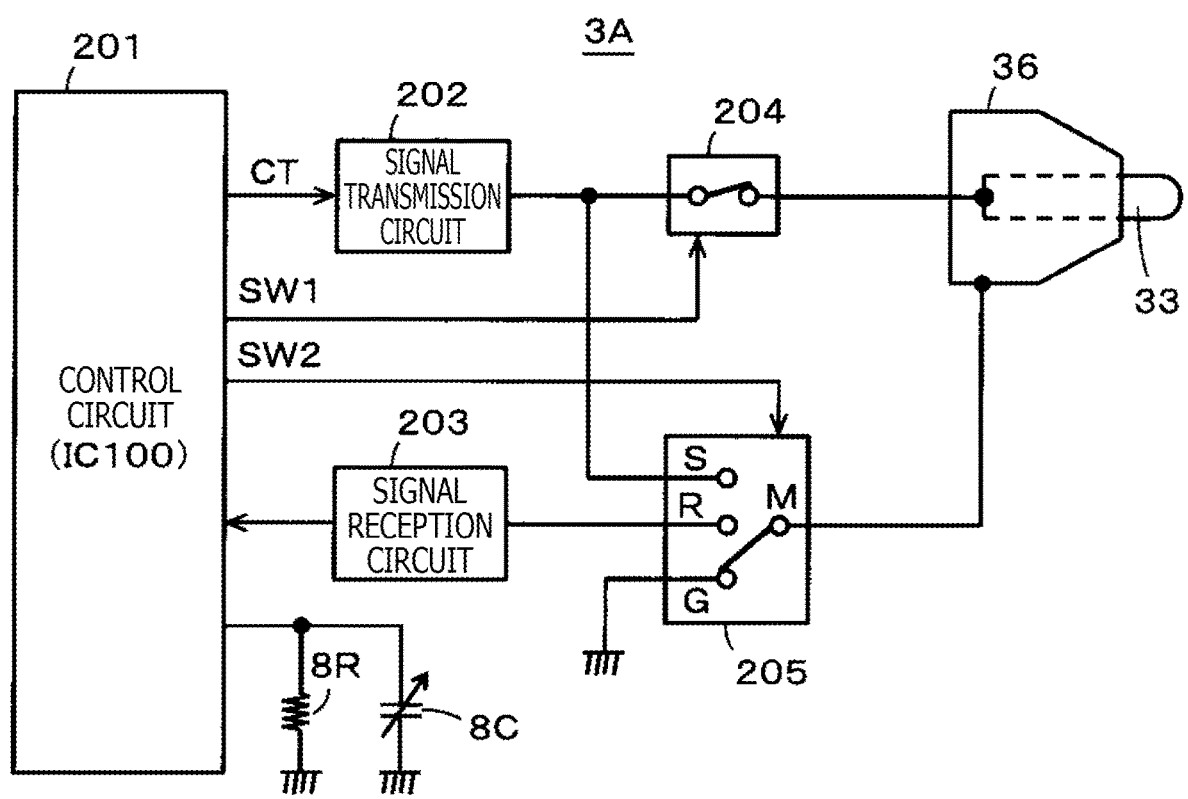
FIG. 10 is a diagram illustrating an example of a configuration of an electronic circuit of the electronic pen cartridge according to the second embodiment of the present disclosure.

Next, an example of an electrical configuration of the electronic pen cartridge 3A according to the second embodiment is illustrated in FIG. 10. In this example, as illustrated in FIG. 10, a control circuit 201 includes an IC (Integrated Circuit) mounted on the printed circuit board 9. The control circuit 201 is connected to a signal transmission circuit 202, a signal reception circuit 203, and the variable capacitor 8C, which is included in the pen-pressure detection unit 8. The variable capacitor 8C is connected in parallel to a resistor 8R.

A signal output end of the signal transmission circuit 202 is connected to the axial center body 33 through a switch circuit 204. In this case, as described above, the conductor terminal member 74, the axial-center-body holder 72, and the conductive elastic member 71 are interposed between the axial center body 33 and the switch circuit 204.

In addition, in this example, the signal output end of the signal transmission circuit 202 is connected to a terminal S of a changeover switch circuit 205. A movable terminal M of the changeover switch circuit 205 is connected to the peripheral electrode 36. In this case, the connection terminal conductor 16 is interposed between the peripheral electrode 36 and the changeover switch circuit 205.

A terminal R of the changeover switch circuit 205 is connected to an input end of the signal reception circuit 203. In addition, a terminal G of the changeover switch circuit 205 is connected to the earth electrode (ground electrode).

The control circuit 201 supplies a control signal SW1, which controls on and off of the switch circuit 204, to the switch circuit 204. In addition, the control circuit 201 supplies a changeover control signal SW2 to the changeover switch circuit 205. The changeover control signal SW2 changes the connection destination of the movable terminal M to the terminal S, the terminal R, or the terminal G.

Although not illustrated in FIG. 10, in the second embodiment as well, the capacitor is configured so as to be charged by the induced current induced in the coil 11. Further, the voltage of the capacitor 10 is supplied as a power supply voltage to each of the control circuit 201, the signal transmission circuit 202, the signal reception circuit 203, the switch circuit 204, and the changeover switch circuit 205.

The signal reception circuit 203 receives a signal received by the peripheral electrode 36 through the capacitive coupling (electric-field coupling) with the position detection sensor of the position detection device, performs processing such as demodulation based on the received signal, and supplies the signal as a result of the processing to the control circuit 201.

The control circuit 201 analyzes the signal from the signal reception circuit 203 to determine the specification of the counterpart position detection device, and also determines the timing of signal interaction with the position detection sensor of the counterpart position detection device. Then, the control circuit 201 controls the format of the signal to be output from the signal transmission circuit 202 such that the format matches the specification of the counterpart position detection device, and interacts with the position detection sensor at the determined timing.

The signal transmission circuit 202 basically outputs, under the control of the control circuit 201, a signal including a position detection signal (burst signal) with a predetermined frequency for the position detection performed in the position detection device and pen-pressure information corresponding to the pen pressure detected by the pen-pressure detection unit 8. In addition, the signal transmission circuit 202 also outputs a signal for detecting the tilt angle of the electronic pen 1A. That is, the signal transmission circuit 202 transmits a burst signal for the position detection and a burst signal for detecting the tilt angle of the electronic pen 1A under the control of the control circuit 201.

Further, the control circuit 201 performs an operation of detecting a pen pressure based on the capacitance of the variable capacitor 8C, which is included in the pen-pressure detection unit 8, during a period in which the burst signal for the position detection is transmitted from the signal transmission circuit 202.

In this example, the control circuit 201 first charges the variable capacitor 8C to a fully charged state, and then stops charging to discharge the variable capacitor 8C through the resistor 8R. Further, the control circuit 201 measures a period of time taken from the start of the discharge until the voltage across the variable capacitor 8C reaches a predetermined voltage determined in advance, and detects the capacitance of the variable capacitor 8C at that time based on the measured period of time. Since the capacitance of the variable capacitor 8C corresponds to the pen pressure applied to the axial center body 33 at that time, the pen pressure is detected based on the detected capacitance.

Further, in this example, the control circuit 201 converts the detected pen pressure into a multi-bit digital signal and controls the signal transmission circuit 202 so as to output the pen-pressure information corresponding to the digital signal, from the signal transmission circuit 202.

In this embodiment, the control circuit 201 executes a position detection period Ta and a tilt detection period Tb in a time division manner. In the position detection period Ta, the burst signal for the position detection and the pen-pressure detection information are transmitted to the position detection device. In the tilt detection period Tb, the tilt angle of the electronic pen 1A is detected.

In the position detection period Ta, the switch circuit 204 is turned on by the control signal SW1, and the movable terminal M is connected to the terminal G by the changeover control signal SW2 in the changeover switch circuit 205. In addition, in the tilt detection period Tb, the switch circuit 204 is turned off by the control signal SW1, and the movable terminal M is connected to the terminal S by the changeover control signal SW2 in the changeover switch circuit 205. Further, in this tilt detection period Tb, the control circuit 201 controls the signal transmission circuit 202 so as to generate the burst signal for the tilt detection.

Figure 11A:
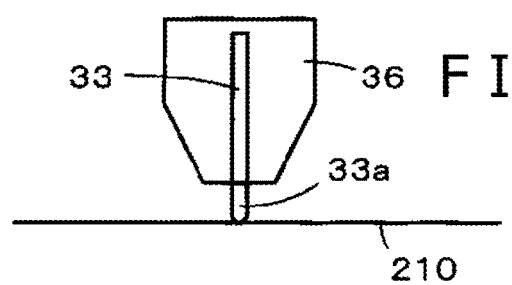
FIGS. 11A-11F illustrate diagrams for describing the detection of the tilt of the electronic pen in the electronic pen according to the second embodiment of the present disclosure.
Figure 11B:
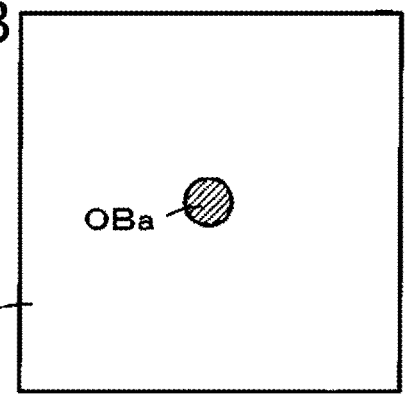
Figure 11C:
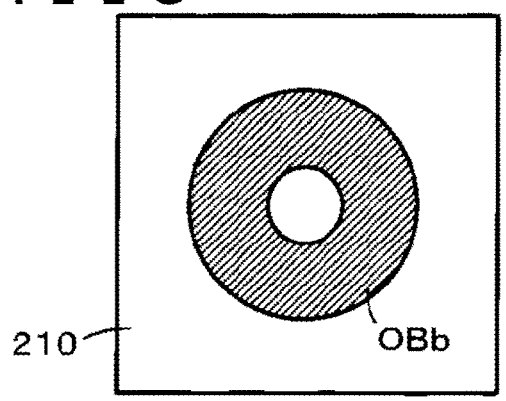

When the axial center body 33 of the electronic pen cartridge 3A of the electronic pen 1A is perpendicular to an input surface 210 of the position detection sensor as illustrated in a schematic diagram of FIG. 11A, the tip portion 33a of the axial center body 33 and the position detection sensor are capacitive-coupled to each other in the position detection period Ta, and a region OBa on the input surface 210 of the position detection sensor in which the capacitive coupling is performed has a perfect circle shape as illustrated in FIG. 11B. By contrast, in the tilt detection period Tb, the peripheral electrode 36 and the position detection sensor are capacitive-coupled to each other, and a region OBb on the input surface 210 of the position detection sensor in which the capacitive coupling is performed has a ring shape as illustrated in FIG. 11C.

Figure 11D:
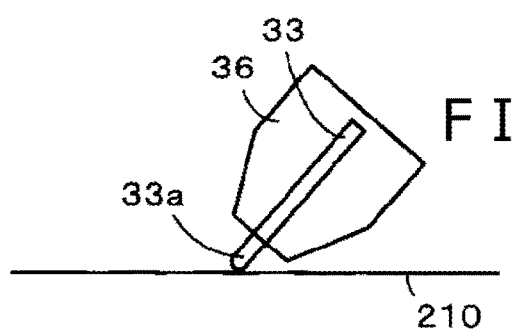
Figure 11E:
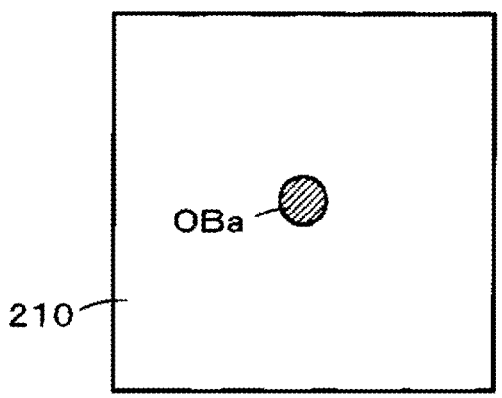

When the axial center body 33 of the electronic pen cartridge 3A of the electronic pen 1A is tilted with respect to the input surface 210 of the position detection sensor, as illustrated in a schematic diagram of FIG. 11D, the region OBa on the input surface 210 of the position detection sensor capacitive-coupled to the tip portion 33a of the axial center body 33 still has a substantially perfect circle in the position detection period Ta, as illustrated in FIG. 11E. By contrast, in the tilt detection period Tb, the region OBb on the input surface 210 of the position detection sensor capacitive-coupled to the peripheral electrode 36 turns into an oval-shaped region corresponding to the tilt angle and elongated in the tilt direction, as illustrated in FIG. 11F.

Figure 11F:
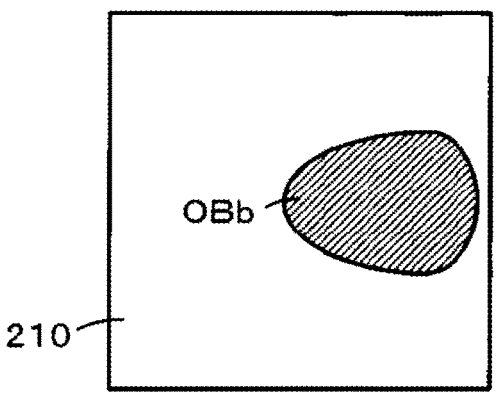

Therefore, the position detection device can detect the size of the tilt angle of the electronic pen 1A from the length in the oval direction of the oval shape of the region OBb illustrated in FIG. 11F. In addition, the position detection device can detect the direction of the tilt of the electronic pen 1A by detecting the oval direction of the oval shape of the region OBb using the position indicated by the electronic pen 1A illustrated in FIG. 11E as a base point.

[Effects of Second Embodiment]

The electronic pen 1A according to the second embodiment can obtain not only the effects of the electronic pen 1 according to the first embodiment described above, but also the following effects.

That is, in the second embodiment, when the electronic pen 1A is in use with the pen tip side of the electronic pen cartridge 3A projecting outward from the opening 2b of the pen housing 2 of the electronic pen 1A, not only the tip portion 33a of the axial center body 33 but also part of the tapered portion 36b on the pen tip side of the peripheral electrode 36 project from the opening 2b of the pen housing 2.

Therefore, even if the electronic pen 1A according to the second embodiment is made thinner, strong electric-field coupling between the electronic pen 1A and the position detection sensor is ensured, and the position detection device can detect the position indicated by the electronic pen 1A with high sensitivity. Further, in the above-described second embodiment as well, the electronic pen
cartridge 3A is configured to be compatible with a refill of a commercially-available ballpoint pen, as with the first embodiment. As a result, when in use, instead of the electronic pen cartridge 3A, a refill of a commercially-available ballpoint pen can be attached to the pen housing 2 of the electronic pen 1A.

[Modifications of Electronic Pen Cartridge]

FIG. 12A illustrates a first modification of the electronic pen cartridge 3A according to the second embodiment described above. In the description of an electronic pen cartridge 3B according to this example, similar constituent components to those of the electronic pen cartridge 3A described above are denoted by the same reference signs, and the detailed description thereof is omitted.

The electronic pen cartridge 3B according to this example uses a peripheral electrode 36B having a shape different from that of the peripheral electrode 36 of the electronic pen cartridge 3A according to the second embodiment described above. That is, as illustrated in FIG. 12A, the peripheral electrode 36B of the electronic pen cartridge 3B according to this example has a tubular shape having an outer diameter that is constant in the axial direction. The outer diameter of the peripheral electrode 36B is the diameter R1, which is smaller than the diameter of the opening 2b (see FIG. 1) of the pen housing 2 of an electronic pen 1B according to this example. Further, in this example, a front cap 37B which is made of an insulating material is attached to the pen tip side of the peripheral electrode 36B.

A cartridge housing 30B of the electronic pen cartridge 3B according to this example includes the housing tubular portion 31A, which includes the metal pipe portion 31Aa and the resin pipe portion 31Ab, as with the electronic pen cartridge 3A according to the second embodiment. Further, as with the second embodiment, the coil 11 is attached to an outer peripheral portion of the resin pipe portion 31Ab, and the one end 11a and the other end 11b of the coil 11 are connected to an electronic circuit in the cartridge housing 30B.

Further, in the electronic pen cartridge 3B according to this example, since the configuration of the peripheral electrode 36B is different from the peripheral electrode 36 of the electronic pen cartridge 3A according to the second embodiment, a tubular coupling member 35B which couples the peripheral electrode 36B to the metal pipe portion 31Aa of the housing tubular portion 31A is configured based on the configuration of the peripheral electrode 36B such that the peripheral electrode 36B can be coupled to the metal pipe portion 31Aa of the housing tubular portion 31A via a ring-shaped flange portion 35BF. Moreover, the front cap 37B is also changed and configured based on the configuration of the peripheral electrode 36B.

The other configurations of the electronic pen cartridge 3B according to this example are similar to those of the electronic pen cartridge 3A according to the second embodiment described above.

Therefore, an electronic pen using the electronic pen cartridge 3B according to the example of FIG. 12A can obtain similar effects to those of the electronic pen 1A according to the second embodiment. When the electronic pen is in use, the axial center body 33, the front cap 37B, and part of the pen tip side of the peripheral electrode 36B project outward from the opening of the pen housing 2 denoted by a dotted line in FIG. 12A. In this case, the tubular portion of the peripheral electrode 36B having the constant outer diameter is located at an opening portion of the pen housing 2. Therefore, adjusting the outer diameter of the tubular portion of the peripheral electrode 36B can easily prevent the pen tip side of the electronic pen cartridge 3B from rattling at the opening of the pen housing 2.

Next, an example of FIG. 12B depicts another example of the modification of the electronic pen cartridge 3A according to the second embodiment described above. In an electronic pen cartridge 3C according to this example, a housing tubular portion 31C and a tubular coupling member 35C of a cartridge housing 30C are different from those of the electronic pen cartridge 3A according to the second embodiment described above, and the other portions have similar configurations to those of the electronic pen cartridge 3A according to the second embodiment.

The cartridge housing 30C of the electronic pen cartridge 3C according to this example includes the housing tubular portion 31C, which has an outer diameter R3 larger than the outer diameter R2 of the housing tubular portion 31A of the electronic pen cartridge 3A described above. That is, in this example as well, the housing tubular portion 31C has a configuration in which a resin pipe portion 31Cb is coupled to a rear end side of a metal pipe portion 31Ca. Further, as with the example described above, a coil 11C is attached to an outer peripheral portion of the resin pipe portion 31Cb, and one end 11Ca and another end 11Cb of the coil 11C are connected to an electronic circuit in the cartridge housing 30C.

In the electronic pen cartridge 3C according to this example, considering that the diameter of the housing tubular portion 31C is different from that of the electronic pen cartridge 3A, the tubular coupling member 35C, which couples the peripheral electrode 36 to the housing tubular portion 31C, is configured based on the configuration of the housing tubular portion 31C such that the peripheral electrode 36 can be coupled to the housing tubular portion 31C via a ring-shaped flange portion 35CF.

In the electronic pen cartridge 3C according to this example, since the housing tubular portion 31C has the large outer diameter R3 as described above and thus has a large inner diameter, the housing tubular portion 31C has a hollow portion having a large space. By using the space of the large hollow portion of the housing tubular portion 31C, the electronic pen cartridge 3C according to this example is configured so as to house, as a power storage device, a capacitor 10C which is larger than the capacitor 10 described above and which has a large power storage capacity. The other configurations are similar to those of the electronic pen cartridge 3A according to the second embodiment described above.

A housing 2C of an electronic pen which houses the electronic pen cartridge 3C according to this example has a diameter thicker than the diameter of the pen housing 2 of the electronic pens 1 and 1A according to the first and second embodiments described above. There are some stationery ballpoint pens that use a housing to which a ballpoint pen refill with this type of a thick diameter is attached. Therefore, there is also an effect that the electronic pen cartridge 3C according to the example of FIG. 12 can use the housing of the stationery ballpoint pen as it is.

An electronic pen cartridge 3D illustrated in FIG. 12C is a modification of the electronic pen cartridge 3B illustrated in FIG. 12A. A peripheral electrode 36D of the electronic pen cartridge 3D according to the example of FIG. 12C is different from the peripheral electrode 36B of the electronic pen cartridge 3B according to the example of FIG. 12A in that its pen tip side is formed as a tapered portion 36Db. That is, the peripheral electrode 36D of the electronic pen cartridge 3D according to this example is shaped such that the tapered portion 36Db is formed on the pen tip side of a tubular-shaped portion 36Da whose outer diameter is the diameter R1, which is smaller than the diameter R0 (see FIG. 1) of the opening 2b of the pen housing 2 of the electronic pen. In this example, a front cap 37D which is made of an insulating material is disposed at a tip portion of the tapered portion 36Db of the peripheral electrode 36D. The other configurations are similar to those of the electronic pen cartridge 3B according to the example of FIG. 12A.

It is noted that, although FIG. 12 illustrates modifications of the electronic pen cartridge 3A according to the second embodiment, similar modifications can also be applied to the electronic pen cartridge 3 according to the first embodiment.

Third Embodiment

In the first and second embodiments described above, only one electronic pen cartridge is housed in the pen housing of the electronic pen. Meanwhile, there are multi-color ballpoint pens available among ballpoint pens as commercially-available stationery. A multicolor ballpoint pen is a ballpoint pen to which refills with different ink colors are attached. A third embodiment provides an electronic pen having a configuration in which electronic pen cartridges are housed in a pen housing having a similar configuration to that of a housing of this multicolor ballpoint pen.

That is, in this third embodiment, one or a plurality of electronic pen cartridges are housed in a pen housing of an electronic pen. Then, when an electronic pen cartridge in the pen housing of the electronic pen is used, the electronic pen cartridge is selected, and a tip of a pen tip portion of the selected electronic pen cartridge is projected from an opening on the pen tip side of the pen housing by a knock mechanism.

FIG. 13 illustrates views for describing an example of a configuration of an electronic pen 1M according to the third embodiment. In FIG. 13, a pen housing 2M of the electronic pen 1M is illustrated in cross section to illustrate the internal configuration thereof in an easy-to-understand manner.

The pen housing 2M of the electronic pen 1M according to the third embodiment has a substantially similar configuration to that of a housing and a knock mechanism of a commercially-available knock-type multicolor ballpoint pen. The pen housing 2M in the example of FIG. 13 is an example of a two-color ballpoint pen.

The pen housing 2M has a tubular body having an opening 2Ma at one end thereof. In this example, as illustrated in FIG. 13, in the pen housing 2M, a first housing portion 221 and a second housing portion 222 which are two portions divided in the axial direction of the pen housing 2M are coupled to each other at a cartridge holding portion 223 so as to be integrally coupled to each other. The opening 2Ma of the pen housing 2M is formed on the side of the first housing portion 221 opposite from the side coupled to the cartridge holding portion 223. The cartridge holding portion 223 includes through-holes 223a and 223b in the hollow portion of the pen housing 2M. Refills of two ballpoint pens are inserted through the respective through-holes 223a and 223b.

In the second housing portion 222, a knock operation portion 230 and a knock operation portion 240 which are for two ballpoint pens, and a stopper 250 are disposed. The knock operation portion 230 includes a projecting portion 231, a projecting portion 232, and a notched groove 234. The projecting portion 231 projects outward from the second housing portion 222. The projecting portion 232 projects toward the central axis direction of the second housing portion 222. The notched groove 234 is engaged with the stopper 250. Similarly, the knock operation portion 240 includes a projecting portion 241, a projecting portion 242, and a notched groove 244. The projecting portion 241 projects outward from the second housing portion 222. The projecting portion 242 projects toward the central axis direction of the second housing portion 222. The notched groove 244 is engaged with the stopper 250. A recessed portion 251 which is engaged with the notched groove 234 of the knock operation portion 230 or the notched groove 244 of the knock operation portion 240 is formed at a tip of the stopper 250.

An end portion on the pen tip side of the knock operation portion 230 and an end portion on the pen tip side of the knock operation portion 240 respectively serve as fitting portions 230a and 240a to which refills of ballpoint pens are fitted. Further, a return spring 235 is disposed between the fitting portion 230a of the knock operation portion 230 and the cartridge holding portion 223, while a return spring 245 is disposed between the fitting portion 240a of the knock operation portion 240 and the cartridge holding portion 223. These return springs 235 and 245 are elastic members for returning their respective knock operation portions 230 and 240 to their original positions.

In the pen housing 2M for a multicolor ballpoint pen having the configuration described above, in the example of FIG. 13, instead of refills of ballpoint pens, an electronic pen cartridge 3AES which has a similar configuration to that of the electronic pen cartridge 3 or 3A of the active capacitance type according to the first or second embodiment described above is housed in the pen housing 2M, by fitting a rear end portion of the electronic pen cartridge 3AES of the capacitance type to the fitting portion 230a of the knock operation portion 230. At the same time, an electronic pen cartridge 3EMR of an electromagnetic induction type is also housed in the pen housing 2M by fitting a rear end portion of the electronic pen cartridge 3EMR to the fitting portion 240a of the knock operation portion 240.

The electronic pen cartridge 3AES according to this example has a similar configuration to that of the electronic pen cartridge 3 or 3A according to the first embodiment, except that the electronic pen cartridge 3AES has the same dimension as the refill of the multicolor ballpoint pen. In addition, the electronic pen cartridge 3EMR of the electromagnetic induction type according to this example also has the same dimension as the refill of the multicolor ballpoint pen.

FIG. 13B is a view for describing the electronic pen cartridge 3EMR of the electromagnetic induction type according to this example. A cartridge housing 30EMR of the electronic pen cartridge 3EMR of the electromagnetic induction type according to this example includes a housing tubular portion 31EMR which is made of a resin and which has the same outer diameter as the housing tubular portion 31 of the electronic pen cartridge 3AES. Further, a magnetic core, in this example, a ferrite core 39 around which a coil 38 is wound is coupled and attached to the pen tip side of the housing tubular portion 31MR.

The outer diameter of the ferrite core 39 is smaller than the diameter of the opening 2Ma of the pen housing 2M. Further, in this example, the ferrite core 39 includes a tapered portion 39a on the pen tip side thereof and a coil wound portion 39b with a constant diameter, and the coil 38 is wound around the coil wound portion 39b.

Although not illustrated, a axial-center-body holding member, a pen-pressure detection unit, and a printed circuit board on which a capacitor connected in parallel to the coil 38 is disposed are disposed in the hollow portion of the housing tubular portion 31EMR, as with the electronic pen cartridges 3 and 3A. In the case of the electronic pen cartridge 3EMR of the electromagnetic induction type, a resonance circuit including the coil 38 and the capacitor receives a signal from the position detection sensor and returns the received signal to the position detection sensor through electromagnetic coupling, so that the position indicated by the electronic pen can be detected. This configuration, therefore, eliminates the need for a power supply circuit.

Further, the ferrite core 39 includes a through-hole formed in the axial direction, and an axial center body 33EMR which is made of a relatively hard and elastic resin material, for example, POM (Polyoxymethylene) is inserted through this through-hole and held by the axial-center-body holding portion in the hollow portion of the housing tubular portion 31EMR. The axial-center-body holding member and the pen-pressure detection unit are configured similarly to the axial-center-body holding member 7 and the pen-pressure detection unit 8 of the electronic pen cartridge 3 of the capacitance type described above.

Further, in the electronic pen 1M having the configuration described above, when either the knock operation portion 230 or the knock operation portion 240 is slidingly moved, the notched groove 234 or 244 of either the knock operation portion 230 or 240 that has been slidingly moved is fitted to the recessed portion 251 of the stopper 250 and locked at that position.

In this case, when the knock operation portion 230 is operated, the tip portion 33a of the axial center body 33 of the electronic pen cartridge 3AES of the capacitance type, and the pen tip side of the front cap 32 or the pen tip side of the front cap 37 and the peripheral electrode 36 project from the opening 2Ma of the pen housing 2M, and the electronic pen 1M operates as the electronic pen of the capacitance type. This is similar to the first and second embodiments described above.

Moreover, when the knock operation portion 240 is operated, the pen tip side of the axial center body 33EMR and the ferrite core 39 of the electronic pen cartridge 3EMR of the electromagnetic induction type projects from the opening 2Ma of the pen housing 2M, and the electronic pen 1M becomes operable as the electronic pen of the electromagnetic induction type.

At this time, since the electronic pen cartridge 3AES of the capacitance type according to this embodiment includes the charging coil 11, it is necessary to take into account a magnetic relation with the coil 38 of the electronic pen cartridge 3EMR of the electromagnetic induction type. However, in the electronic pen cartridge 3AES of the capacitance type according to this embodiment, the charging coil 11 is disposed in a resin pipe portion 31AESb on the rear end side of a cartridge housing 30AES of the electronic pen cartridge 3AES, and is located away from the coil 38 of the electronic pen cartridge 3EMR of the electromagnetic induction type in the axial direction. Therefore, the charging coil 11 has little effect on an electromagnetic coupling between the coil 38 of the electronic pen cartridge 3EMR of the electromagnetic induction type and the position detection sensor.

Further, when the operation (knock operation) of slidingly moving either the knock operation portion 230 or the knock operation portion 240 toward the pen tip side is performed and thereafter the knock operation portion that has not been operated is operated so as to be slidingly moved toward the pen tip side, the knock operation portion that had previously been slidingly moved toward the pen tip side can return to the original position.

In this way, with the electronic pen 1M according to the third embodiment, there is an effect that the electronic pen cartridge 3AES of the capacitance type and the electronic pen cartridge 3EMR of the electromagnetic induction type can selectively be used by the knock operation. Further, the electronic pen 1M according to the third embodiment is also convenient in that placing the electronic pen 1M in the recess 101b of the electronic pen charging tray 100 illustrated in FIG. 6 can charge a capacitor as a power storage device of the electronic pen cartridge 3AES of the capacitance type.

It is noted that, instead of the electronic pen cartridge 3EMR of the electromagnetic induction type, a refill of a ballpoint pen may be fitted to the knock operation portion 240 in the electronic pen 1M according to the third embodiment. In this way, it is possible to provide an electronic pen in which the function of the stationery ballpoint pen and the function of the electronic pen of the capacitance type can be selected.

It is noted that, although the third embodiment is an example in which the two knock operation portions are disposed, three or more knock operation portions may be disposed.

Other Embodiments or Modifications

In the electronic pen cartridges according to the first to third embodiments described above, the portion of the cartridge housing on which the coil 11 is disposed is the resin pipe portion. However, this portion is not limited to a resin material. As long as this portion is an insulator, this portion may be made of a ferrite core, ceramics, or the like.

It is noted that, in the electronic pen cartridges according to the first to third embodiments described above, it is possible to form the cartridge housing 30 with only the metal pipe portion, and to dispose the coil 11 on the metal pipe portion.

DESCRIPTION OF REFERENCE SYMBOLS 1, 1A, 1M: Electronic pen
2, 2M: Pen housing
3, 3A, 3AES: Electronic pen cartridge of capacitance type
11: Coil
30, 30A Cartridge housing
30, 31 A Housing tubular portion
31A, 31Aa: Metal pipe portion
31B, 31Ab: Resin pipe portion
33: Axial center body
36: Peripheral electrode
100: Electronic pen charging tray

The invention claimed is:

1. An electronic pen cartridge housed in a tubular pen housing of an electronic pen such that at least a pen tip is projectable from an opening on one side in an axial direction of the pen housing, the electronic pen cartridge comprising:
a tubular cartridge housing;
a conductive center electrode having one end in an axial direction thereof that serves as the pen tip;
a peripheral electrode disposed to surround the center electrode except for at least the pen tip and insulated from the center electrode;
a signal transmission circuit configured to generate a signal;
a first switch circuit configured to be turned on to supply the signal to the conductive center electrode;
a second switch circuit configured to be turned on to supply the signal to the peripheral electrode;
a control circuit configured to turn on the first switch circuit and the second switch circuit in a time division manner;
a rechargeable power storage device that is disposed in the cartridge housing and that is configured to supply a power supply voltage to the signal transmission circuit; and
a coil wound around a portion of the cartridge housing, wherein the coil is not wound around a ferrite core, wherein the power storage device is configured to be charged by a current induced in the coil based on an externally supplied magnetic field.

2. The electronic pen cartridge according to claim 1, wherein a rear end portion of the cartridge housing, which is opposite from the pen tip side of the cartridge housing, is fitted to a fitting portion in the pen housing of the electronic pen.

3. The electronic pen cartridge according to claim 1, wherein a charging circuit configured to charge the power storage device is disposed in the cartridge housing, and the coil is electrically connected to the charging circuit.

4. The electronic pen cartridge according to claim 1, wherein the portion of the cartridge housing, around which the coil is wound, is formed of an insulator including resin.

5. The electronic pen cartridge according to claim 1, wherein the portion of the cartridge housing, around which the coil is wound, is formed of an insulator including magnetic material.

6. The electronic pen cartridge according to claim 1, wherein a remaining portion of the cartridge housing, except for the portion around which the coil is wound, is made of a metal, and
a ground terminal of the signal transmission circuit is electrically connected to the portion of the cartridge housing made of the metal, and one end of the coil is electrically connected to the portion of the cartridge housing made of the metal.

7. The electronic pen cartridge according to claim 1, wherein, when the signal is supplied from the signal transmission circuit to the center electrode, the peripheral electrode is configured to be grounded and function as a shield electrode.

8. The electronic pen cartridge according to claim 1, wherein the peripheral electrode, in response to receiving the signal generated by the signal transmission circuit, functions as a tilt detection electrode.

9. An electronic pen that includes a tubular pen housing having an opening at one end in an axial direction of the pen housing, the one end being a pen tip side, at least one electronic pen cartridge being housed in the pen housing,
wherein the electronic pen cartridge includes
a tubular cartridge housing,
a conductive center electrode having one end in an axial direction thereof that serves as a pen tip,
a peripheral electrode disposed to surround the center electrode except for at least the pen tip and insulated from the center electrode,
a signal transmission circuit configured to generate a signal,
a first switch circuit configured to be turned on to supply the signal to the conductive center electrode,
a second switch circuit configured to be turned on to supply the signal to the peripheral electrode,
a control circuit configured to turn on the first switch circuit and the second switch circuit in a time division manner,
a rechargeable power storage device that is disposed in the cartridge housing and that is configured to supply a power supply voltage to the signal transmission circuit, and a coil wound around an outside of a portion of the cartridge housing, wherein the coil is not wound around a ferrite core, and wherein the power storage device is configured to be charged by a current induced in the coil based on an externally supplied magnetic field.

10. The electronic pen according to claim 9, wherein, when the electronic pen is in use with the one end of the center electrode serving as the pen tip projecting outward from the opening of the pen housing, a part of a pen tip side of the peripheral electrode also projects outward from the opening of the pen housing.

11. The electronic pen according to claim 9, wherein a diameter of a part of the electronic pen cartridge that projects from the opening of the pen housing is equal to or less than a diameter of a pen tip of a refill of a ballpoint pen, and a length of the electronic pen cartridge is substantially equal to a length of the refill of the ballpoint pen.

12. The electronic pen according to claim 11, wherein the pen housing is configured to house the refill of the ballpoint pen to function as the ballpoint pen.

13. The electronic pen according to claim 11, wherein a knock-type ballpoint pen mechanism for the electronic pen cartridge or for the refill of the ballpoint pen is disposed in the pen housing.

14. The electronic pen according to claim 11, wherein a knock-type multicolor ballpoint pen mechanism is disposed in the pen housing so as to house a plurality of the electronic pen cartridges and to selectively cause one end of one of the plurality of the electronic pen cartridges to project outward from the opening.

15. The electronic pen according to claim 11, wherein the pen housing houses one or more of the refills of the ballpoint pen, in place of one or more of the electronic pen cartridges, to be operable as a knock-type multicolor ballpoint pen.

16. An electronic pen charging tray for an electronic pen that includes a tubular pen housing having an opening at one end in an axial direction of the pen housing, the one end being a pen tip side, at least one electronic pen cartridge being housed in the pen housing, the electronic pen cartridge including
a tubular cartridge housing,
a conductive center electrode having one end in an axial direction thereof that serves as a pen tip,
a peripheral electrode disposed to surround the center electrode except for at least the pen tip and insulated from the center electrode,
a signal transmission circuit configured to generate a signal,
a first switch circuit configured to be turned on to supply the signal to the conductive center electrode,
a second switch circuit configured to be turned on to supply the signal to the peripheral electrode,
a control circuit configured to turn on the first switch circuit and the second switch circuit in a time division manner,
a rechargeable power storage device that is disposed in the cartridge housing and that is configured to supply a power supply voltage to the signal transmission circuit, and
a coil wound around an outside of a portion of the cartridge housing, wherein the coil is not wound around a ferrite core,
wherein the power storage device is configured to be charged by a current induced in the coil based on an externally supplied magnetic field,
wherein the electronic pen charging tray comprises:
a recess configured to receive and lock the electronic pen placed therein, the recess having a length greater than a length of the pen housing of the electronic pen in the axial direction of the pen housing;
a magnetic-field generation coil disposed to form a magnetic flux in a direction along the axial direction of the electronic pen placed and locked in the recess; and
an alternating-current signal generation circuit configured to generate and supply an alternating-current signal to the magnetic-field generation coil, which generates an alternating-current magnetic field.

17. The electronic pen charging tray according to claim 16, wherein the coil is wound around a resin pipe that forms the portion of the cartridge housing or is a hollow coil.

18. The electronic pen cartridge according to claim 1, wherein the coil is wound around a resin pipe that forms the portion of the cartridge housing or is a hollow coil.

19. The electronic pen according to claim 9, wherein the coil is wound around a resin pipe that forms the portion of the cartridge housing or is a hollow coil.

* * * * *